(12) United States Patent
Fujisaki

(10) Patent No.: US 8,351,130 B2
(45) Date of Patent: Jan. 8, 2013

(54) ZOOM LENS AND IMAGE PICKUP APPARATUS EQUIPPED WITH SAME

(75) Inventor: Toyokatsu Fujisaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/236,054

(22) Filed: Sep. 19, 2011

(65) Prior Publication Data
US 2012/0087017 A1  Apr. 12, 2012

(30) Foreign Application Priority Data

Oct. 8, 2010  (JP) ................................. 2010-228571

(51) Int. Cl.
*G02B 15/14* (2006.01)
(52) U.S. Cl. ......................... 359/687; 359/683; 359/686
(58) Field of Classification Search .................. 359/683, 359/686, 687, 708
See application file for complete search history.

(56) References Cited

U.S. PATENT DOCUMENTS

| 7,177,092 B2 | 2/2007 | Satori et al. |
| 7,206,137 B2 | 4/2007 | Nakatani et al. |

*Primary Examiner* — Jack Dinh
(74) *Attorney, Agent, or Firm* — Rossi, Kimms & McDowell LLP

(57) ABSTRACT

A zoom lens includes, in order from the object side to the image side, a positive refractive first lens unit, a negative refractive second lens unit, a positive refractive third lens unit, and a rear group including one or more lens units. The first lens unit consists of a negative lens and a positive lens. The first to third lens units and the lens units constituting the rear group move at a time of zooming. The first and third lens units move relative to the image plane in such a way that their respective positions at the telephoto end are displaced toward the object side from their respective positions at the wide angle end. The focal lengths f1, f2 of the first and second lens units and the focal lengths fw, ft of the whole system at the wide angle end and at the telephoto end are arranged appropriately.

16 Claims, 13 Drawing Sheets

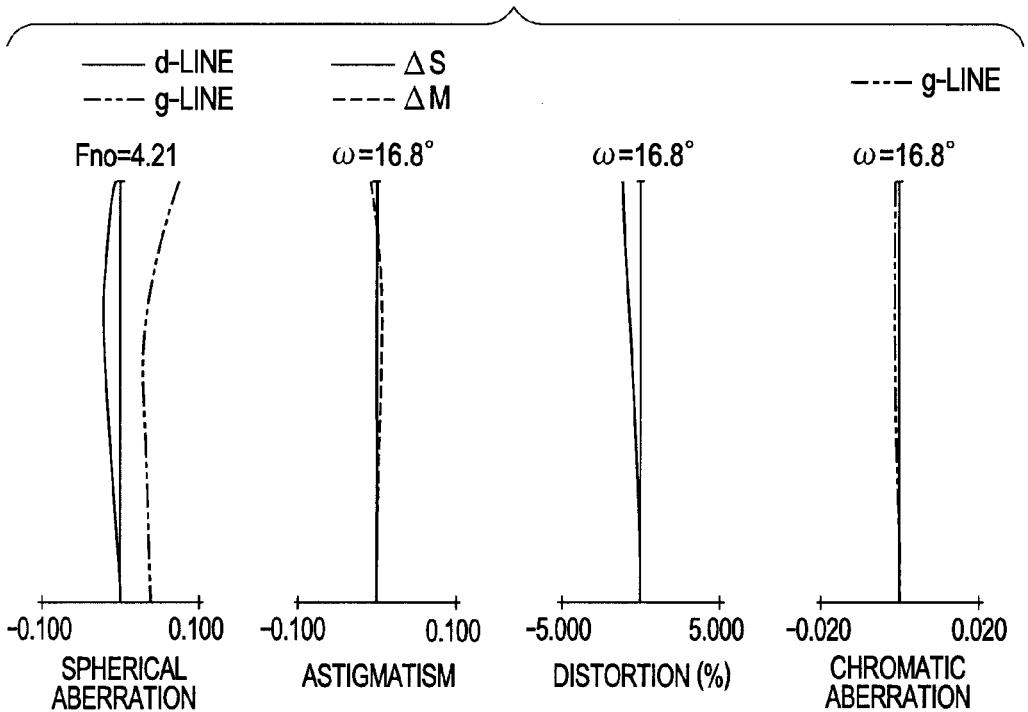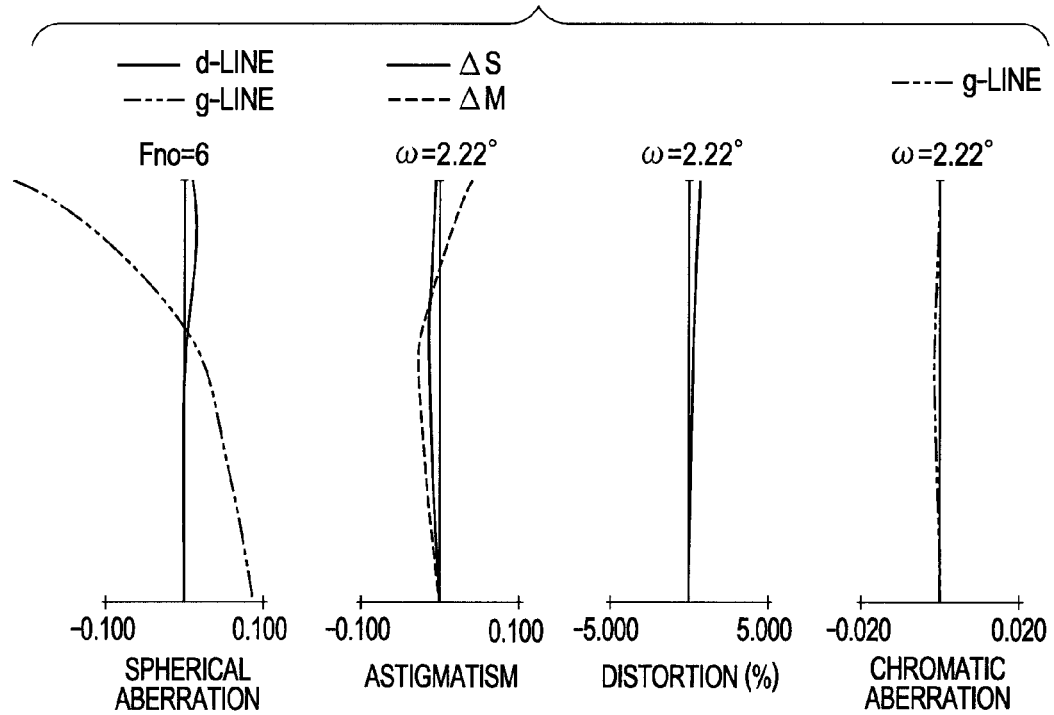

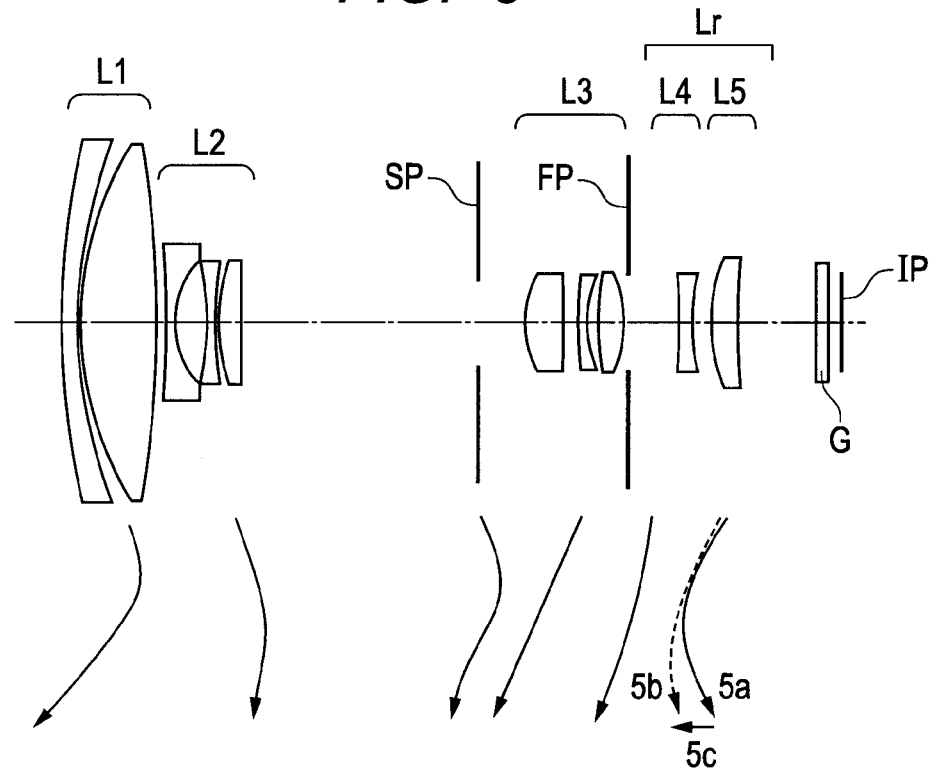
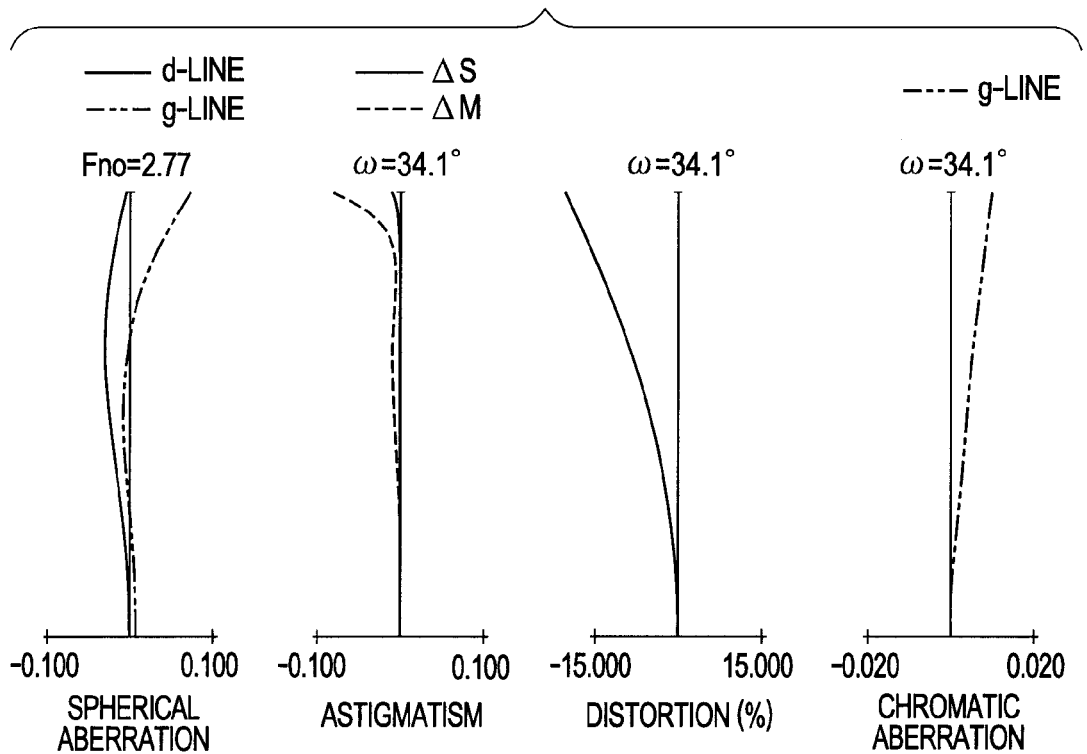

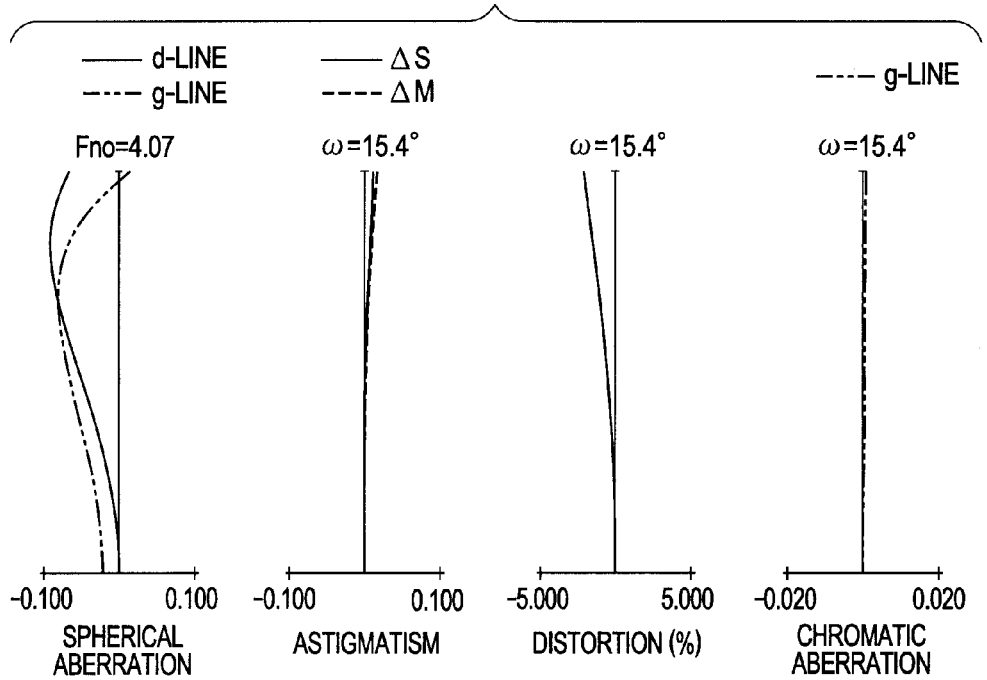
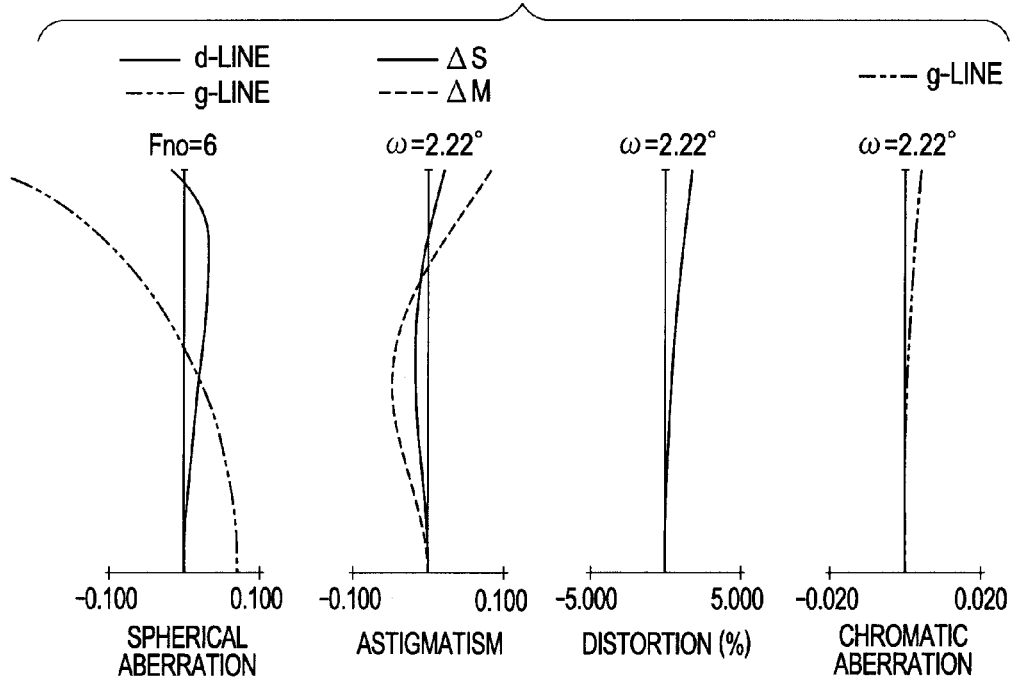

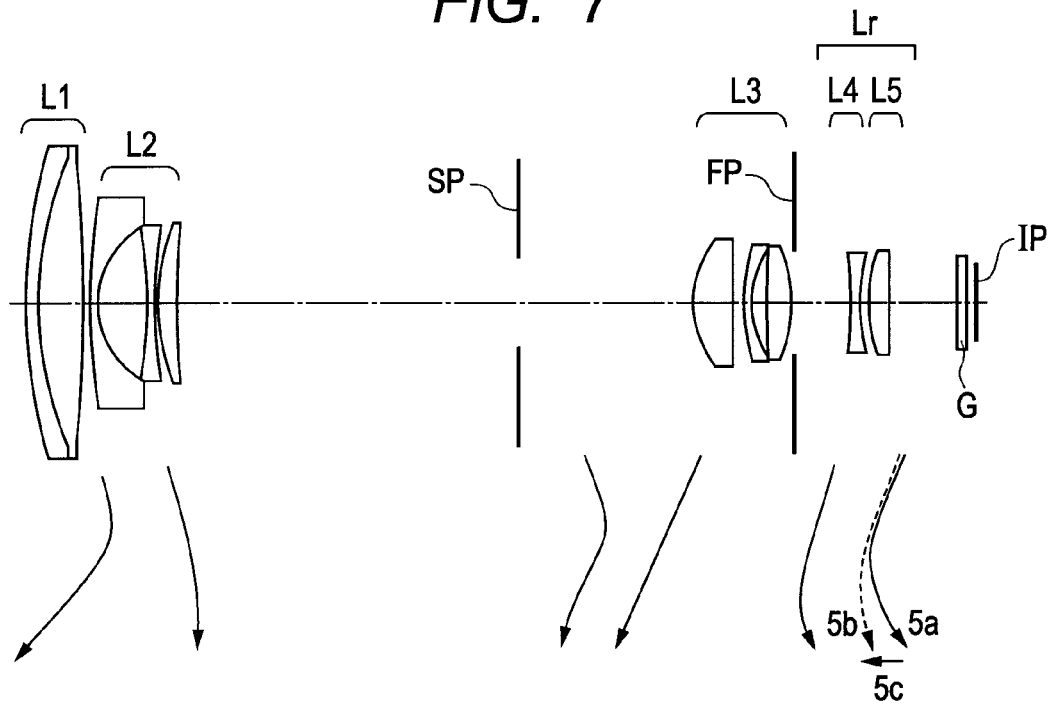
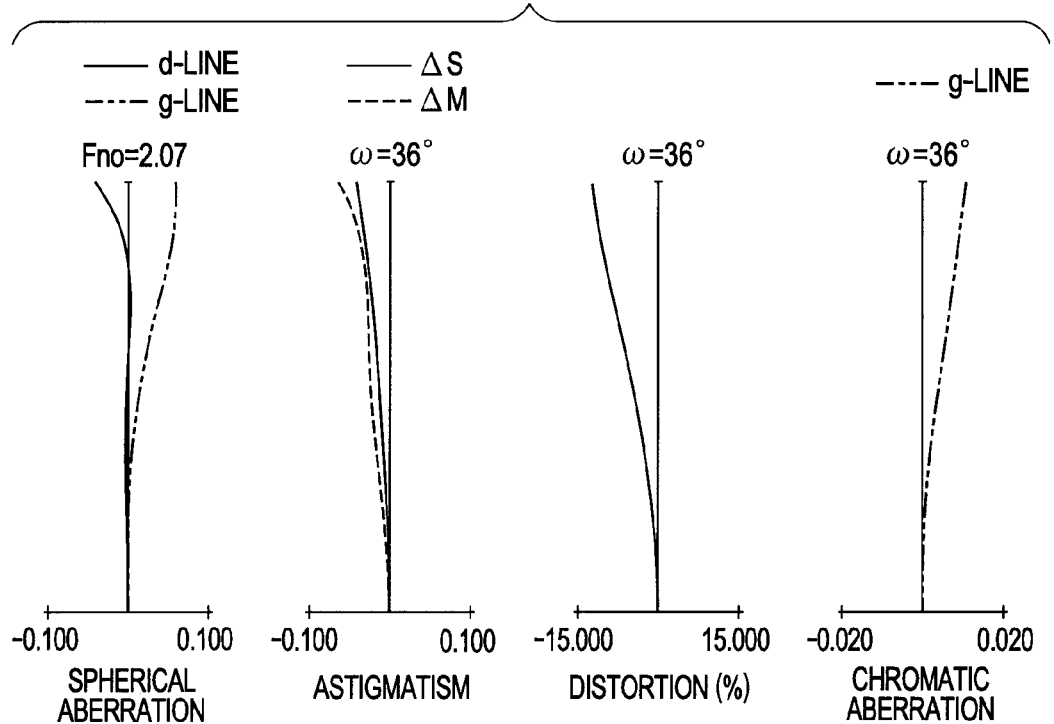

ZOOM LENS AND IMAGE PICKUP APPARATUS EQUIPPED WITH SAME

BACKGROUND OF THE INVENTION

1. Field of the Invention

The present invention relates to a zoom lens and an image pickup apparatus equipped with the same. The present invention can suitably applied to an image pickup apparatus using a solid state image pickup element, such as a video camera, electronic still camera, broadcast camera and surveillance camera and to an image pickup apparatus such as a camera using a silver halide film.

2. Description of the Related Art

Positive-lead type zoom lenses in which a first lens unit located closest to the object side has a positive refractive power have been known.

U.S. Pat. No. 7,206,137 discloses a zoom lens composed of four lens units having, in order from the object side to the image side, positive, negative, positive, and positive refractive powers respectively and a zoom lens composed of five lens units having, in order from the object side to the image side, positive, negative, positive, positive, and positive refractive powers respectively. The zoom lenses disclosed in U.S. Pat. No. 7,206,137 has a zoom ratio not lower than 15 and a field angle of approximately 62 degrees at the wide angle end. U.S. Pat. No. 7,177,092 discloses a zoom lens composed of five lens units including, in order from the object side, positive, negative, positive, negative, and positive refractive powers respectively. The zoom lens disclosed in U.S. Pat. No. 7,177,092 has a zoom ratio of approximately 10 and a field angle of approximately 76 degrees at the wide angle end.

In order to enables the retraction of a zoom lens into a camera body thereby achieve slimming of the camera when not in use, it is generally effective to increase the refractive power (or the optical power, which is equal to the reciprocal of the focal length) of the lens units that constitute the zoom lens high and to reduce the number of lenses in each lens unit. However, if a zoom lens is designed in this way, an increase in the thickness of lenses will be necessitated with an increase in the refractive power of lens surfaces in order for each lens to have an appropriate edge thickness, an increase in the front lens diameter in particular will result, and satisfactory reduction in the lens size will fail to be achieved. Moreover, difficulty in correction of aberration such as chromatic aberration at the telephoto end will also result.

To achieve a high zoom ratio and size reduction at the same time, it is important to optimize the refractive power of the lens units, the overall length of the zoom lens, and the imaging magnification of the zooming lens unit. In the aforementioned four-unit and five-unit zoom lenses, it will be difficult to achieve good optical performance while achieving a high zoom ratio higher than 10 and wide field angle, unless the refractive power of the lens units is appropriately set.

An object of the present invention is to provide a zoom lens that is slim in the lens thickness when in a retracted state, has a wide field angle and high zoom ratio, and achieves high optical performance throughout the entire zoom range. Another object of the present invention is to provide an image pickup apparatus equipped with such a zoom lens.

SUMMARY OF THE INVENTION

A zoom lens according to the present invention comprises, in order from the object side to the image side, a first lens unit having a positive refractive power, a second lens unit having a negative refractive power, a third lens unit having a positive refractive power, and a rear group including one or more lens units, wherein the first lens unit consists of a negative lens and a positive lens, the lens units move at a time of zooming, the position of the first lens unit at the telephoto end is displaced toward the object side from its position at the wide angle end, the position of the third lens unit at the telephoto end is displaced toward the object side from its position at the wide angle end, and the zoom lens satisfies the following conditional expressions:

$10.5 < f1/fw < 30.0$, and $0.010 < |f2/ft| < 0.181$, where f1 is the focal length of the first lens unit, f2 is the focal length of the second lens unit, fw is the focal length of the whole system at the wide angle end, and ft is the focal length of the whole system at the telephoto end.

Further features of the present invention will become apparent from the following description of exemplary embodiments with reference to the attached drawings.

BRIEF DESCRIPTION OF THE DRAWINGS

FIGS. 4A, 4B, and 4C are aberration diagrams of numerical embodiment 2 corresponding to the second embodiment of the present invention respectively at the wide angle end, at an intermediate zoom position, and at the telephoto end.

FIG. 5 is a cross sectional view of a zoom lens according to a third embodiment of the present invention at the wide angle end.

FIGS. 6A, 6B, and 6C are aberration diagrams of numerical embodiment 3 corresponding to the third embodiment of the present invention respectively at the wide angle end, at an intermediate zoom position, and at the telephoto end.

FIG. 7 is a cross sectional view of a zoom lens according to a fourth embodiment of the present invention at the wide angle end.

FIGS. 8A, 8B, and 8C are aberration diagrams of numerical embodiment 4 corresponding to the fourth embodiment of the present invention respectively at the wide angle end, at an intermediate zoom position, and at the telephoto end.

DESCRIPTION OF THE EMBODIMENTS

Preferred embodiments of the present invention will now be described in detail in accordance with the accompanying drawings.

In the following, the zoom lens and an image pickup apparatus equipped with the same according to the present invention will be described. The zoom lens according to the present invention includes, in order from the object side to the image side, a first lens unit having a positive refractive power, a second lens unit having a negative refractive power, a third lens unit having a positive refractive power, a rear group including one or more lens units. The first lens unit L1 comprises a negative lens and a positive lens. At the time of zooming, the first to third lens units and the lens unit(s) that constitute the rear group moves. Specifically, the first lens unit moves relative to the image pickup surface in such a way that the position of the first lens unit at the telephoto end (of the zoom range) is displaced toward the object side from its position at the wide angle end (of the zoom range), and the third lens unit moves relative to the image pickup surface in such a way that the position of the third lens unit at the telephoto end is displaced toward the object side from its position at the wide angle end.

Figure 1:
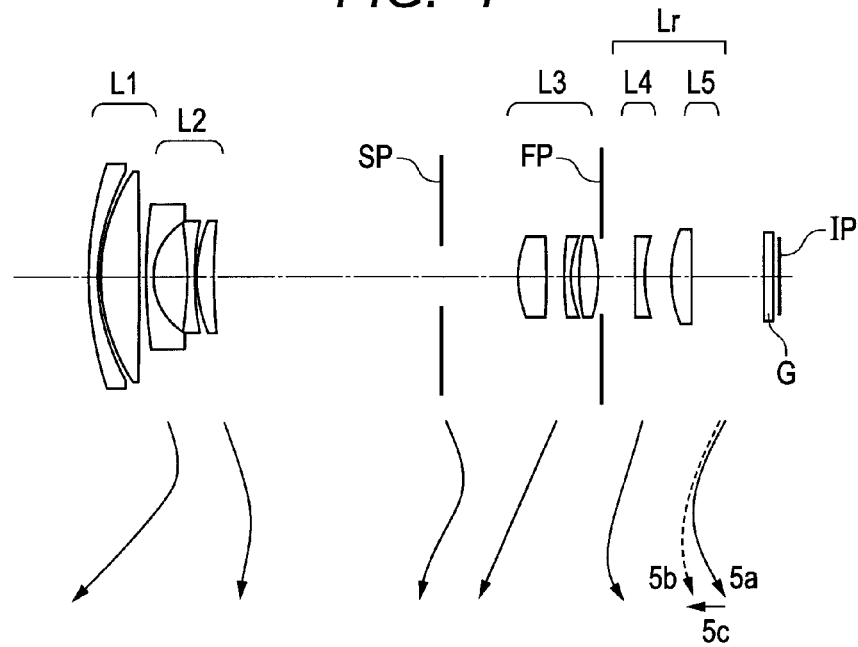
FIG. 1 is a cross sectional view of a zoom lens according to a first embodiment of the present invention at the wide angle end.
Figure 2A:
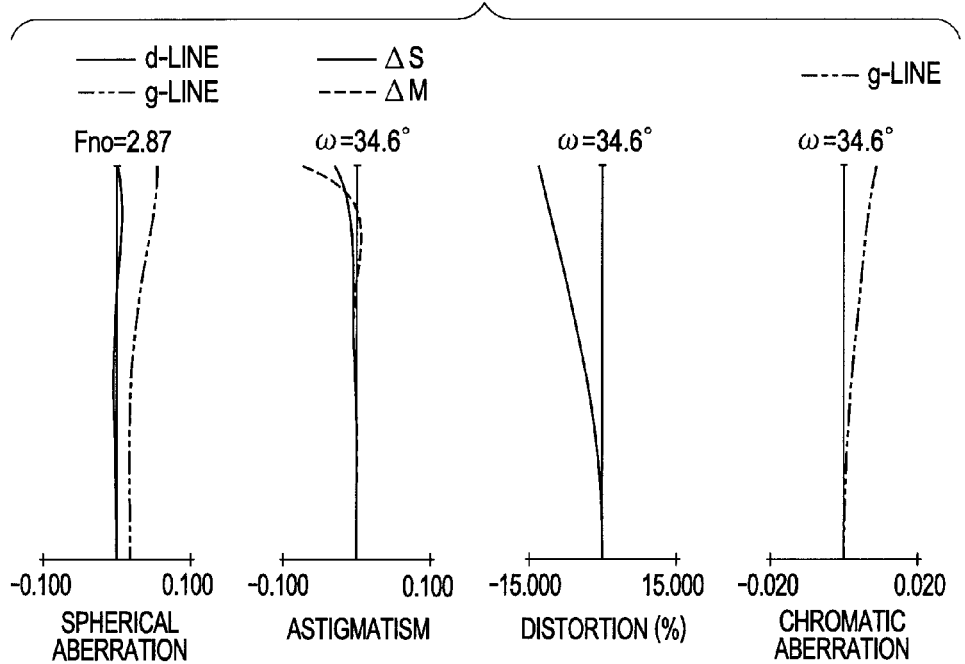
FIGS. 2A, 2B, and 2C are aberration diagrams of numerical embodiment 1 corresponding to the first embodiment of the present invention respectively at the wide angle end, at an intermediate zoom position, and at the telephoto end.
Figure 2B:
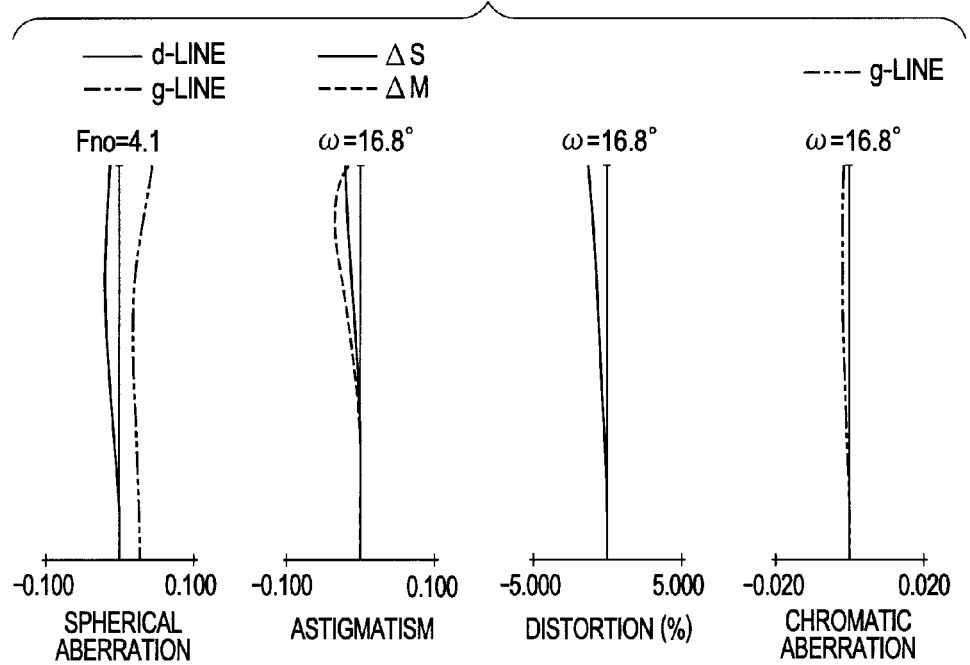
Figure 2C:
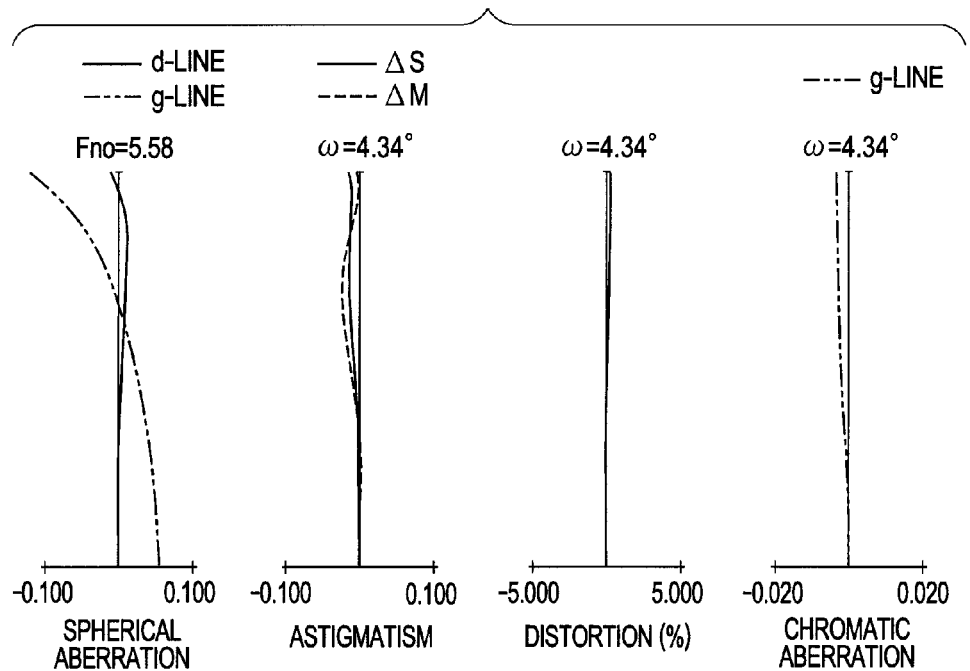
Figure 3:
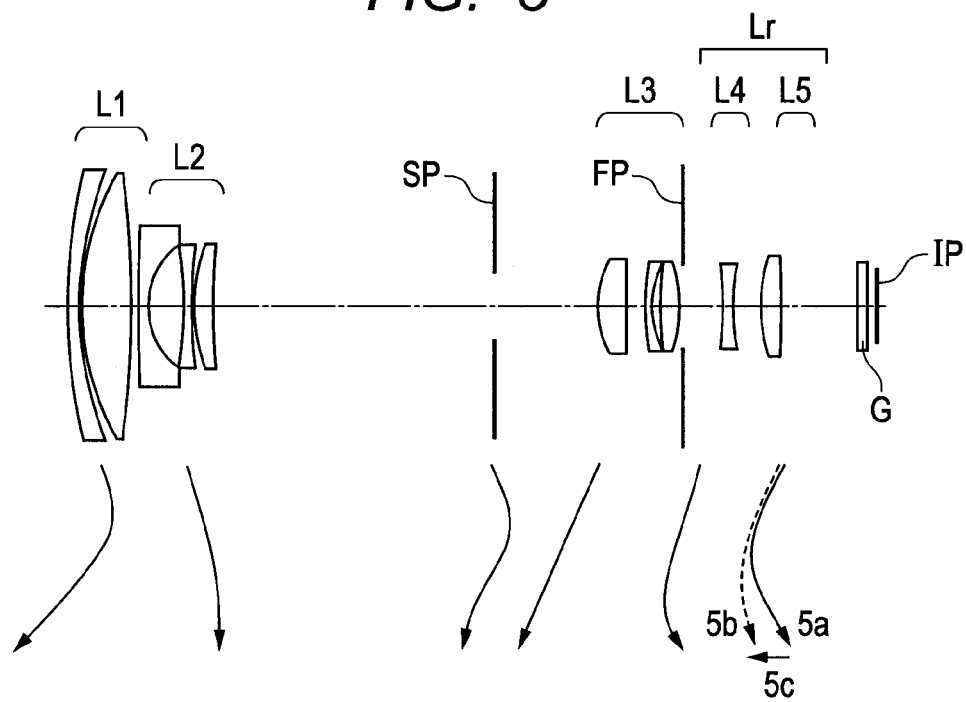
FIG. 3 is a cross sectional view of a zoom lens according to a second embodiment of the present invention at the wide angle end.
Figure 4A:
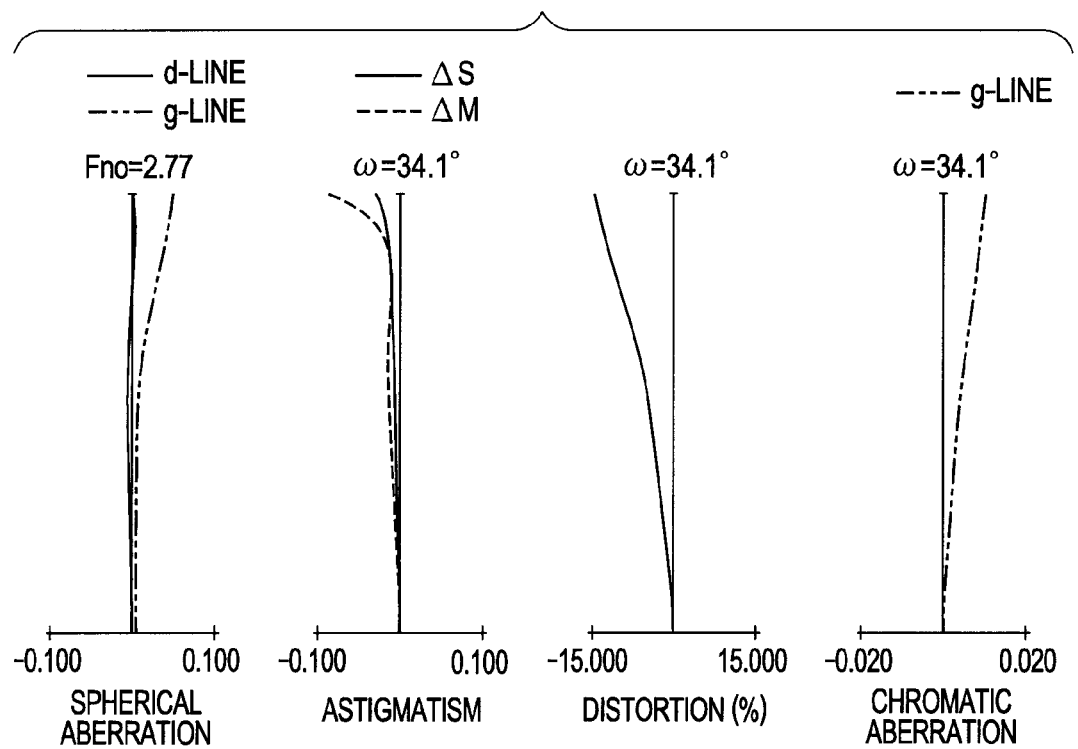
Figure 8B:
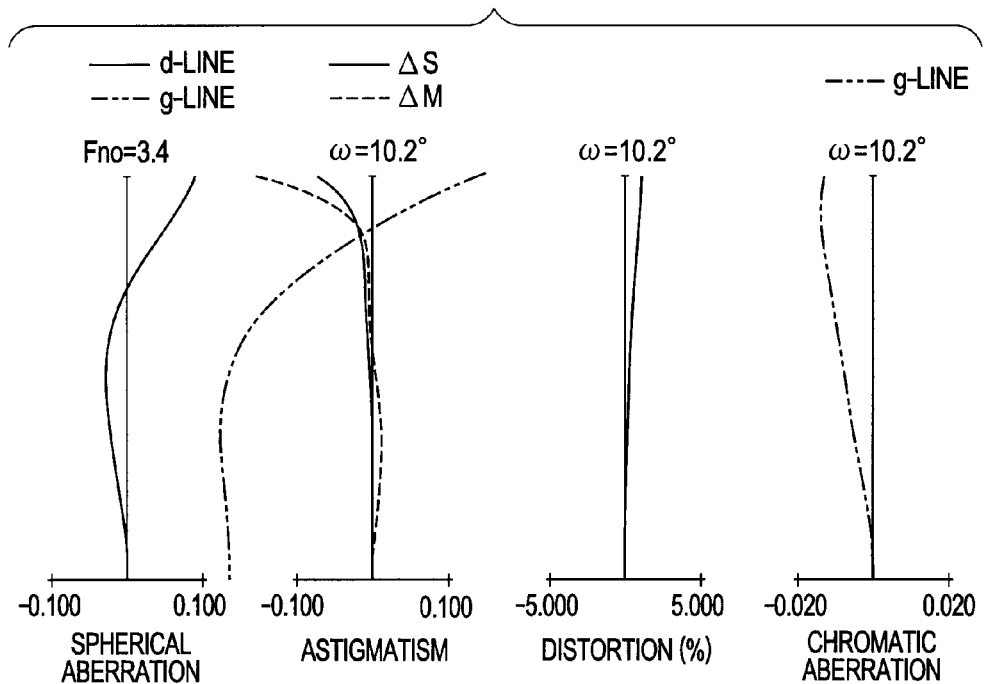
Figure 8C:
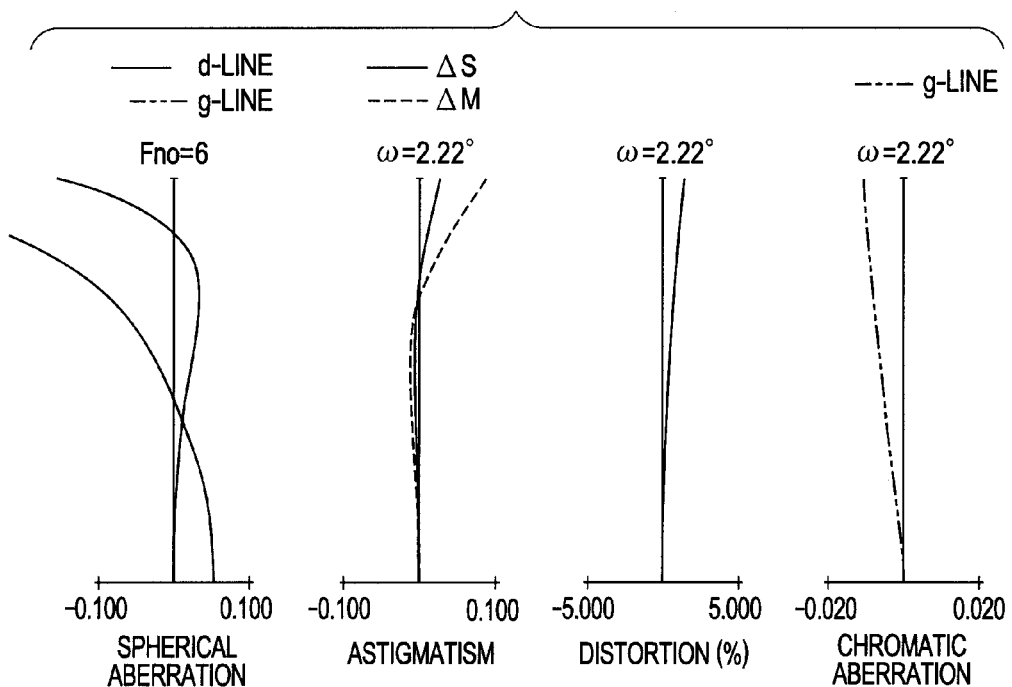
Figure 9:
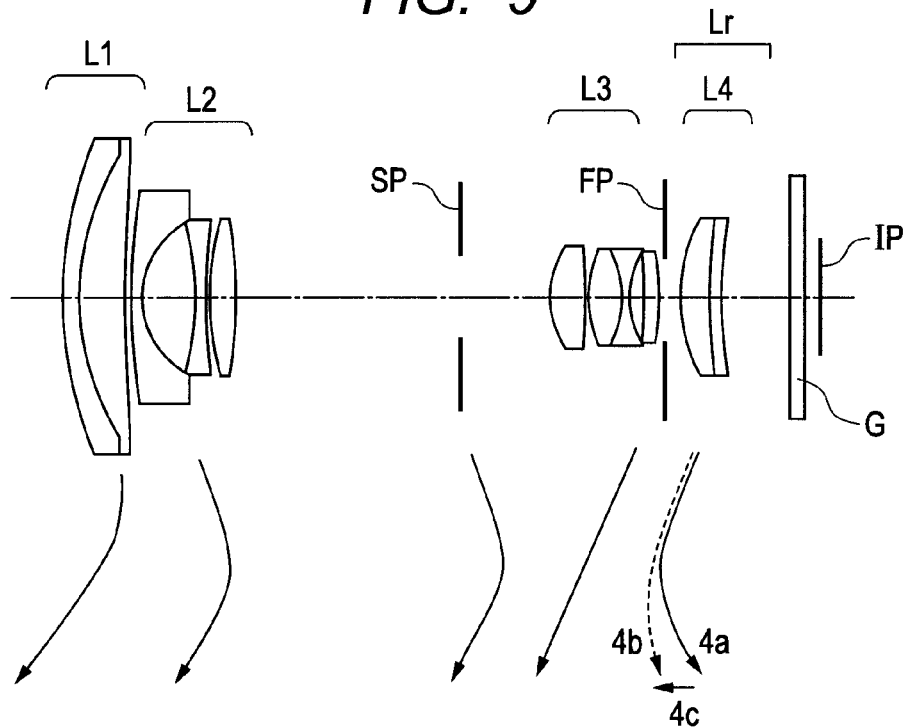
FIG. 9 is a cross sectional view of a zoom lens according to a fifth embodiment of the present invention at the wide angle end.
Figure 10A:
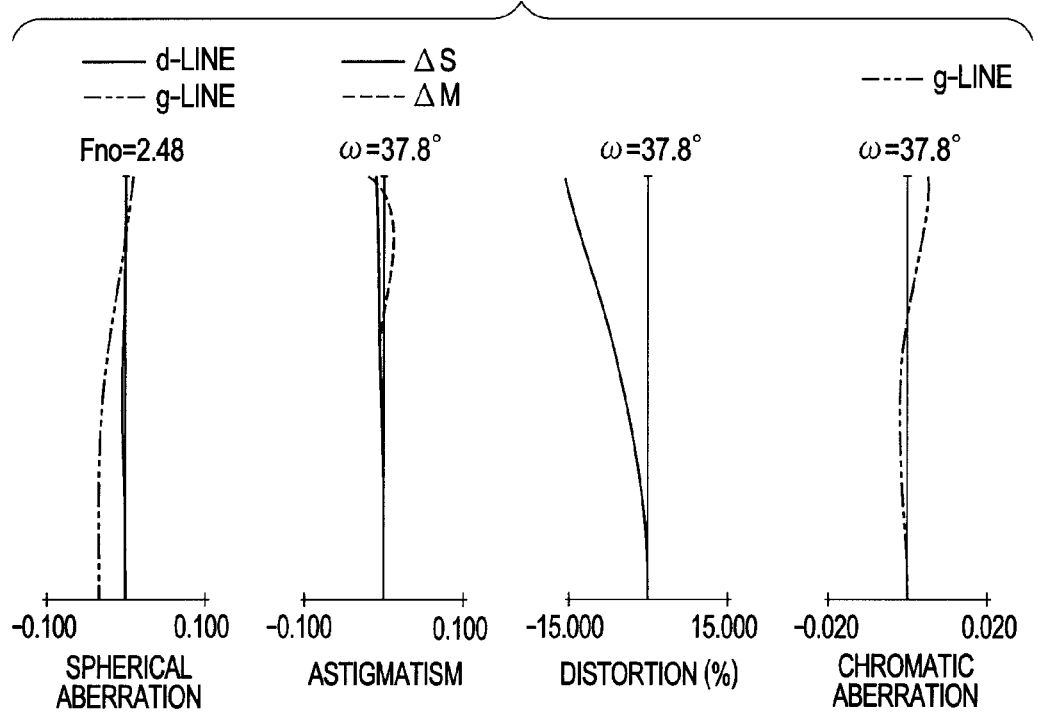
FIGS. 10A, 10B, and 10C are aberration diagrams of numerical embodiment 5 corresponding to the fifth embodiment of the present invention respectively at the wide angle end, at an intermediate zoom position, and at the telephoto end.
Figure 10B:
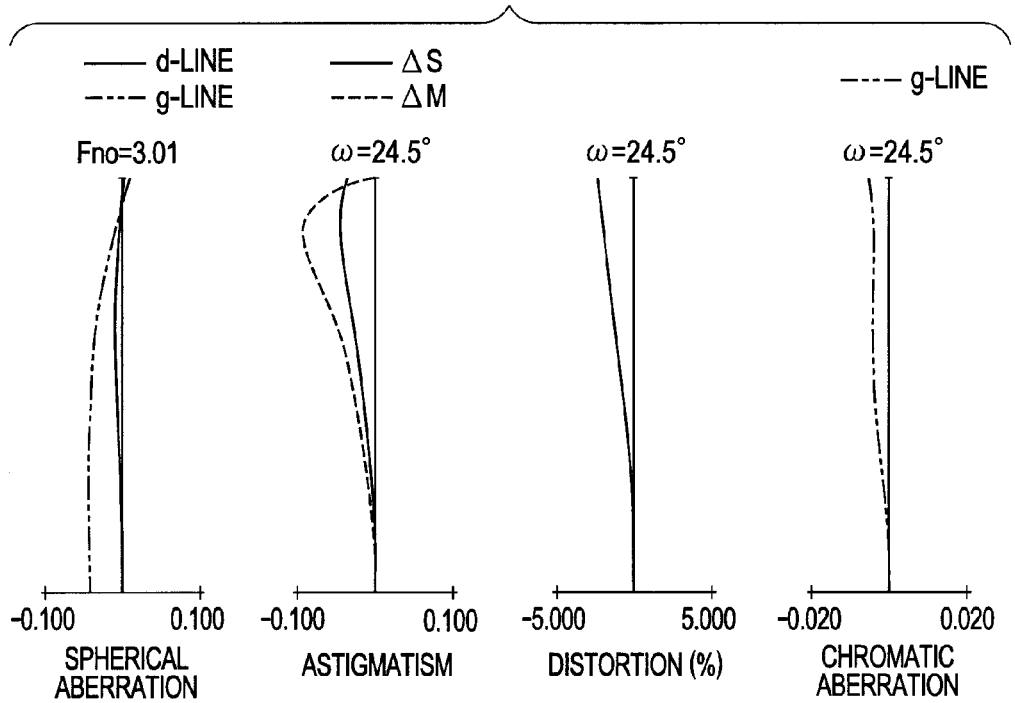
Figure 10C:
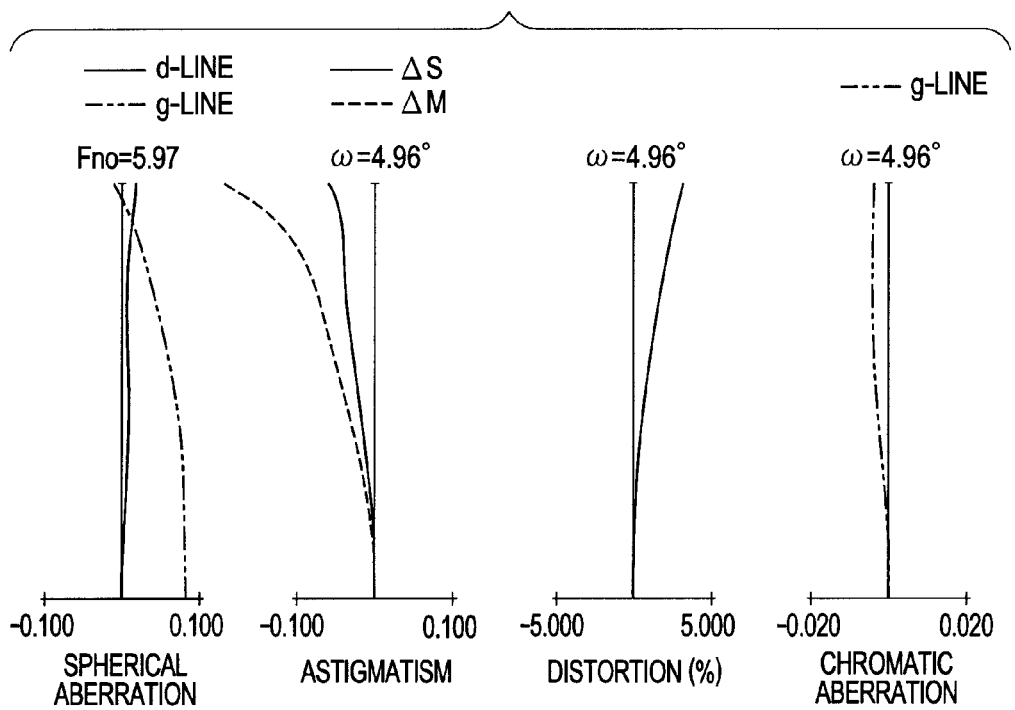
Figure 11:
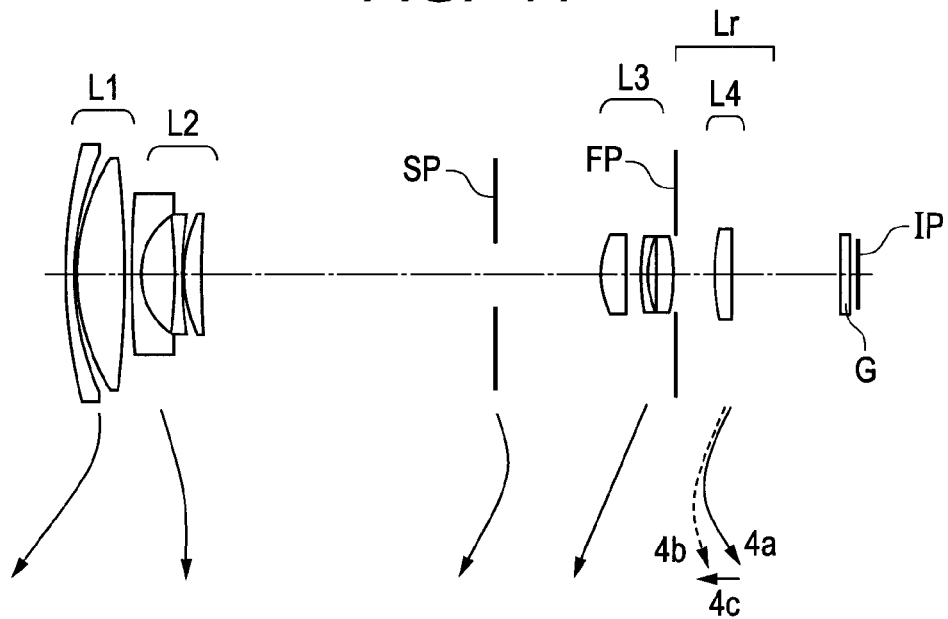
FIG. 11 is a cross sectional view of a zoom lens according to a sixth embodiment of the present invention at the wide angle end.
Figure 12A:
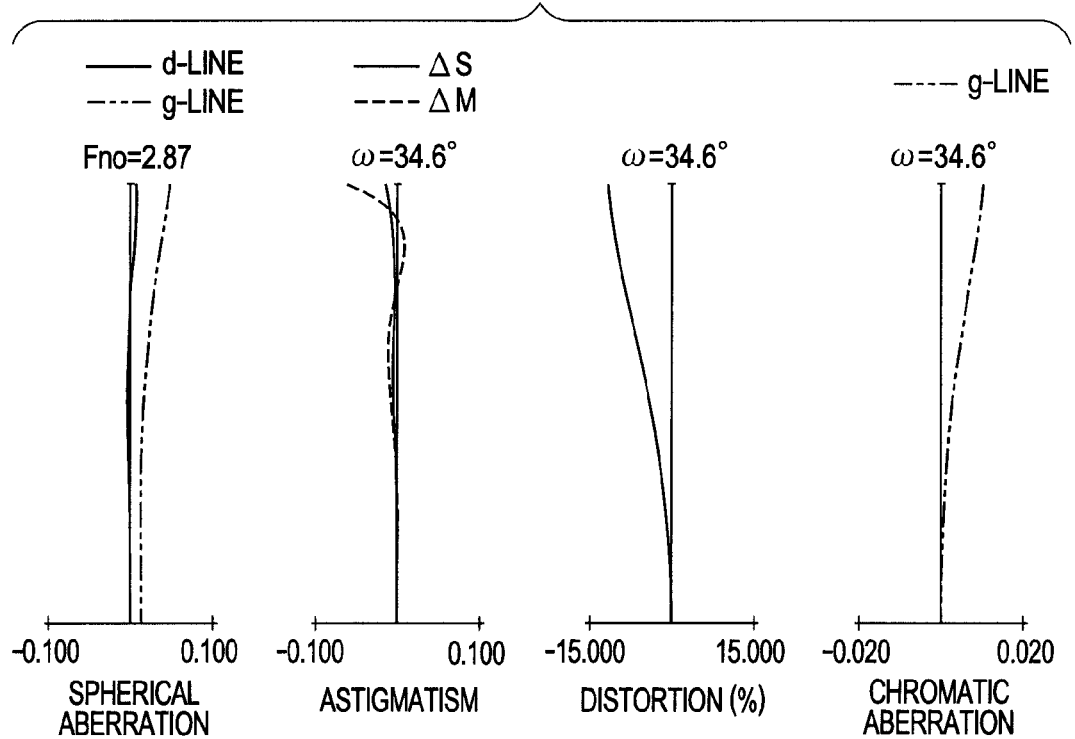
FIGS. 12A, 12B, and 12C are aberration diagrams of numerical embodiment 6 corresponding to the sixth embodiment of the present invention respectively at the wide angle end, at an intermediate zoom position, and at the telephoto end.
Figure 12B:
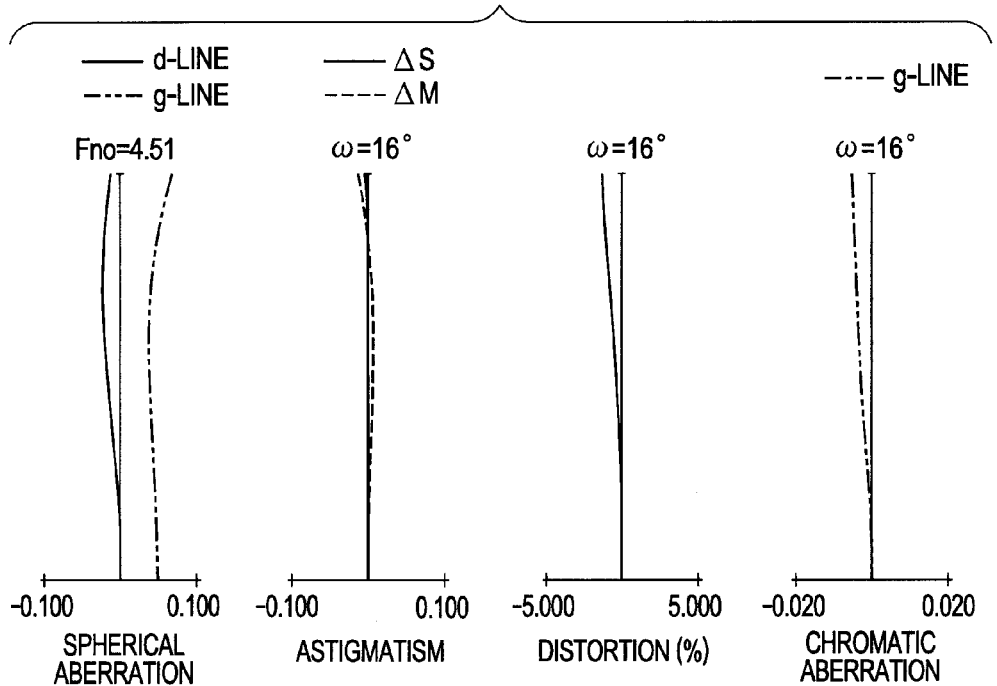
Figure 12C:
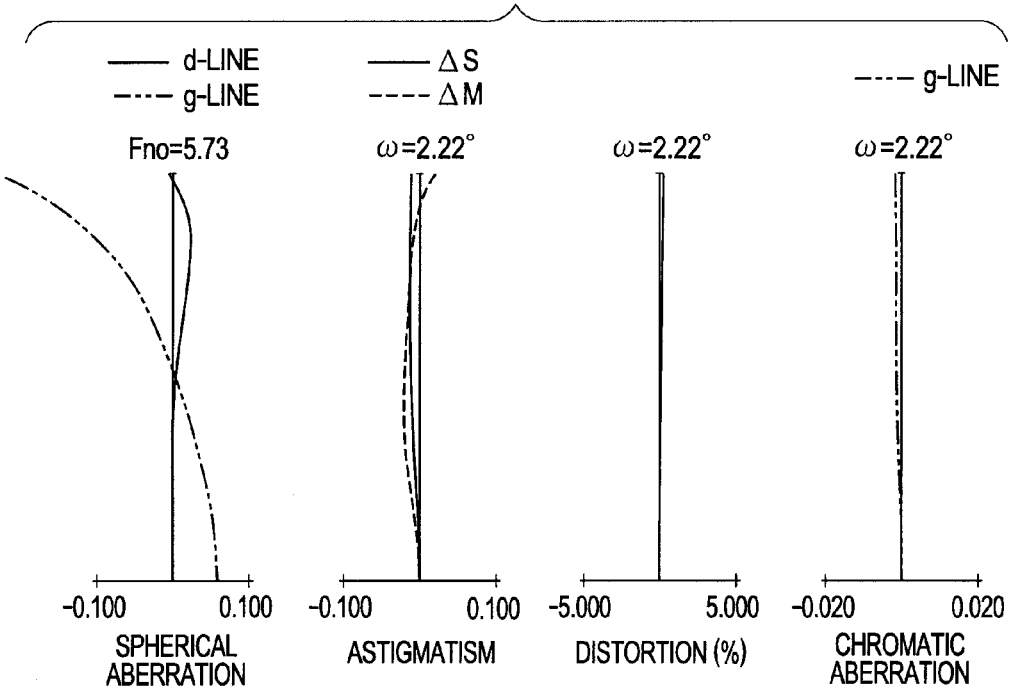

FIG. 1 is a cross sectional view of the zoom lens according to a first embodiment of the invention at the wide angle end (namely in the shortest focal length state). FIGS. 2A, 2B and 2C show aberrations of the zoom lens according to the first embodiment at the wide angle end, at an intermediate zoom position, and at the telephoto end (namely, in the longest focal length state) respectively. FIG. 3 is a cross sectional view of the zoom lens according to a second embodiment of the invention at the wide angle end. FIGS. 4A, 4B and 4C show aberrations of the zoom lens according to the second embodiment at the wide angle end, at an intermediate zoom position, and at the telephoto end respectively. FIG. 5 is a cross sectional view of the zoom lens according to a third embodiment of the invention at the wide angle end. FIGS. 6A, 6B and 6C show aberrations of the zoom lens according to the third embodiment at the wide angle end, at an intermediate zoom position, and at the telephoto end respectively. FIG. 7 is a cross sectional view of the zoom lens according to a fourth embodiment of the invention at the wide angle end. FIGS. 8A, 8B and 8C show aberrations of the zoom lens according to the fourth embodiment at the wide angle end, at an intermediate zoom position, and at the telephoto end respectively. FIG. 9 is a cross sectional view of the zoom lens according to a fifth embodiment of the invention at the wide angle end. FIGS. 10A, 10B and 10C show aberrations of the zoom lens according to the fifth embodiment at the wide angle end, at an intermediate zoom position, and at the telephoto end respectively. FIG. 11 is a cross sectional view of the zoom lens according to a sixth embodiment of the invention at the wide angle end. FIGS. 12A, 12B and 12C show aberrations of the zoom lens according to the sixth embodiment at the wide angle end, at an intermediate zoom position, and at the telephoto end respectively.

Figure 13:
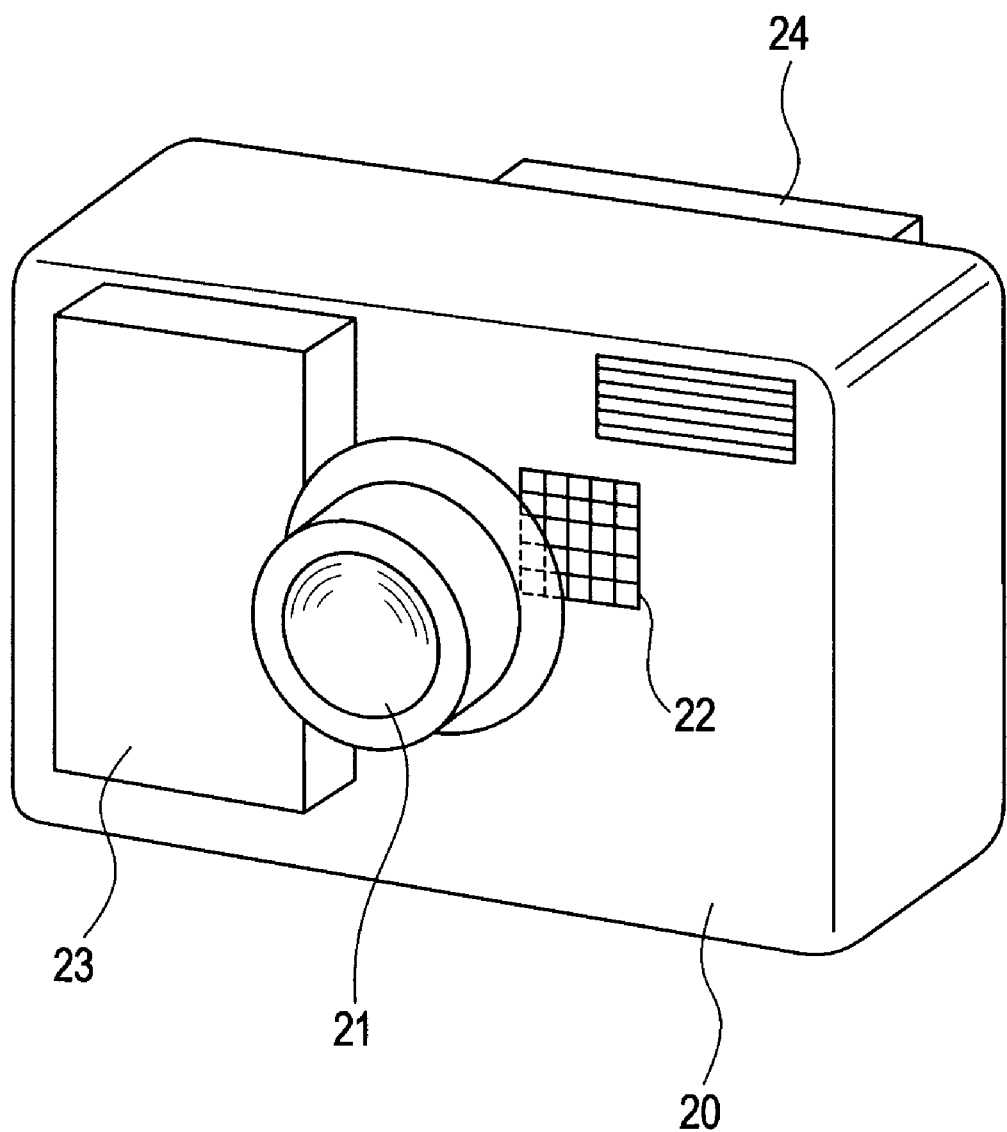
FIG. 13 is a perspective view schematically illustrates a relevant portion of an image pickup apparatus according to the present invention.

FIG. 13 is a schematic diagram showing a relevant portion of a camera (or image pickup apparatus) equipped with a zoom lens according to an embodiment of the present invention. The zoom lenses according to the embodiments are taking lens systems that may be used in image pickup apparatuses such as video cameras, digital cameras and film cameras. In the cross sectional views of the zoom lenses, the object is on the left side (which is the front side), and the image is on the right side (which is the rear side). In the cross sectional views of the zoom lenses, the i-th lens unit (counted from the object side to the image side) is denoted by Li (i=1, 2, 3, . . . ) and the rear group including one or more lens units is denoted by Lr.

As shown in the cross sectional views of FIGS. 1, 3, 5 and 7, the zoom lenses according to the first to fourth embodiments each have a first lens unit L1 having a positive refractive power, a second lens unit L2 having a negative refractive power, a third lens unit L3 having a positive refractive power, and a rear group Lr including a fourth lens unit L4 having a negative refractive power and a fifth lens unit L5 having a positive refractive power. The zoom lenses according to the first to fourth embodiments are five-unit, positive-lead type zoom lenses.

As shown in the cross sectional views of FIGS. 9 and 11, the zoom lens according to the fifth and sixth embodiments each have a first lens unit L1 having a positive refractive power, a second lens unit L2 having a negative refractive power, a third lens unit L3 having a positive refractive power, and a rear group Lr including a fourth lens unit L4 having a positive refractive power. The zoom lenses according to the fifth and sixth embodiments are four-unit, positive-lead type zoom lenses.

The zoom lenses according to the embodiments have an aperture stop SP disposed on the object side of the third lens unit L3. The zoom lenses according to the embodiments have a flare stop FP disposed on the image side of the third lens unit L3 to block unwanted light. The zoom lenses according to the embodiments also have an optical block G such as, for example, an optical filter, a face plate, a crystal low pass filter, or an infrared cut filter etc. The cross sectional views of the zoom lenses according to the embodiments also show the image plane IP at which a photosensitive surface is placed. In cases where the zoom lenses are used as the taking optical system of a video camera or a digital still camera, the photosensitive surface is an image pickup surface of a solid state image pickup element (or photoelectric conversion element) such as a CCD sensor or a CMOS sensor. In cases where the zoom lenses are used in a film camera, the photosensitive surface is the film surface.

In aberration diagrams, d and g are for the d-line and the g-line respectively, ΔM and ΔS are for the meridional image surface and the sagittal image surface, and lateral chromatic aberration is shown with respect to the g-line. In the aberration diagrams, the half field angle (i.e. the half of the field angle) co and the F-number Fno are also given. In the embodiments described in the following, the wide angle end and the telephoto end refer to the zoom positions assumed at the time when the zooming lens unit is located at both ends of its mechanically movable range along the optical axis. The arrows in the cross sectional views of the embodiments indicate the loci of the movement of the lens unit at the time of zooming from the wide angle end to the telephoto end or at a time of focusing.

In the zoom lenses according to the first to fourth embodiments shown in FIGS. 1, 3, 5 and 7, the first lens unit L1 moves along a locus convex toward an image at the time of zooming from the wide angle end to the telephoto end as indicated by an arrow. The second lens unit moves along a non-linear locus convex toward an image. The third lens unit L3 moves toward an object. The fourth lens unit L4 moves along a locus convex toward an object or toward an image. The fifth lens unit L5 moves along a locus convex toward an object. The aperture stop SP moves along a locus different from that of the other lens units. The flare cut stop FP moves integrally with the third lens unit L3. In these zoom lenses, focusing is performed in the rear-focus scheme in which the fifth lens unit L5 is moved along the optical axis for focusing.

Upon focusing operation from an object at infinity to an object at a short distance at the telephoto end, the fifth lens unit L5 is moved forward as shown by arrow 5c in the cross sectional views of the zoom lenses. The solid arrow 5a and the broken arrow 5b represent the loci of movement of the fifth lens unit L5 for compensating displacement of the image plane caused by zooming from the wide angle end to the telephoto end respectively at the time when the zoom lens is focused on an object at infinity and at the time when the zoom lens is focused on an object at a short distance.

In the zoom lenses according to the first to fourth embodiments, the third lens unit L3 having a positive refractive power is shifted in a direction having a component perpendicular to the optical axis to thereby reduce blur in the picked-up image when the whole optical system (zoom lens) vibrates (or tilts), namely shift the image formed by the whole system in a direction perpendicular to the optical axis. In the zoom lenses according to the fifth and sixth embodiments shown in FIGS. 9 and 11, the first lens unit L1 moves along a locus convex toward an image at the time of zooming from the wide angle end to the telephoto end as indicated by an arrow. The second lens unit L2 moves along a non-linear locus convex toward an image. The third lens unit L3 moves toward an object. The fourth lens unit L4 moves along a locus convex toward an object. The aperture stop SP moves along a locus different from that of the other lens units. The flare cut stop FP moves integrally with the third lens unit L3. In these zoom lenses, focusing is performed in the rear-focus scheme in which the fourth lens unit L4 is moved along the optical axis for focusing. Upon focusing operation from an object at infinity to an object at a short distance at the telephoto end, the fourth lens unit L4 is moved forward as shown by arrow 4c in the cross sectional views of the zoom lenses. The solid arrow 4a and the broken arrow 4b represent the loci of movement of the fourth lens unit L4 for compensating displacement of the image plane caused by zooming from the wide angle end to the telephoto end respectively at the time when the zoom lens is focused on an object at infinity and at the time when the zoom lens is focused on an object at a short distance. In the zoom lenses according to the fifth and sixth embodiments, the third lens unit L3 having a positive refractive power is shifted in a direction having a component perpendicular to the optical axis to thereby shift the imaging position in a direction perpendicular to the optical axis, namely reduce blur in the picked-up image when the whole optical system (zoom lens) vibrates (or tilts).

In the zoom lenses according to the embodiments, at the time of zooming, the first lens unit L1 and the third lens unit L3 move relative to the image plane in such a way that they are located closer to the object at the telephoto end than at the wide angle end. This enables reducing the overall length of the zoom lens at the wide angle end, reducing the front lens effective diameter, and achieving a high zoom ratio (i.e. magnification change ratio). In the zoom lenses according to the embodiment in particular, the third unit L3 is adapted to move toward the object at the time of zooming from the wide angle end to the telephoto end to contribute to the magnification change. In addition, the first lens unit L1 having a positive refractive power is adapted to move toward the object. This causes the second lens unit L2 to contribute largely to the magnification change. Thus, high zoom ratios of 10 to 20 are achieved without making the refractive powers of the first lens unit L1 and the second lens unit L2 so high. The zoom lenses according to the embodiments use the rear-focus scheme, in which the fourth lens unit L4 is moved along the optical axis for focusing in the case of the fifth and sixth embodiments, and the fifth lens unit L5 is moved along the optical axis for focusing in the case of the first to fourth embodiments. Alternatively, in the first to fourth embodiments, the focusing operation may be performed by moving the fourth lens unit L4 having a negative refractive power. When this is the case, upon focusing operation from an object at infinity to an object at a short distance at the telephoto end, the fourth lens unit L4 having a negative refractive power is moved backward (i.e. toward the image).

Moreover, in the zoom lenses according to the embodiments, the third lens unit L3 having a positive refractive power is shifted in a direction having a component perpendicular to the optical axis to thereby shift the image formed by the whole system in a direction perpendicular to the optical axis. Thus, a reduction of blur (or image stabilization) of the picked-up image upon vibration (or tilt) of the entire optical system (zoom lens) is achieved without the use of an additional optical component like a variable apex angle prism or a dedicated lens unit for image stabilization, namely without an increase in the overall size of the optical system. When the third lens unit L3 is shifted in a direction perpendicular to the optical axis for image stabilization, the third lens unit L3 may be rotated with the rotation axis on the optical axis, if a complexity in the barrel structure is allowed. Alternatively, a part of the third lens unit L3 is shifted in a direction having a component perpendicular to the optical axis to reduce blur of the picked-up image. In the zoom lenses according to the embodiments, the aperture stop SP moves along a locus different from those of the lens units at the time of zooming. This lessens steep fall-off of the light quantity in the peripheral region of the image frame (i.e. at image heights higher than a middle image height) at zoom positions at and near the wide angle end and leads to a reduction in the front lens diameter.

In order to make the effective lens diameter (or the front lens effective diameter) small and to slim the camera at a time of retracted state, it is preferred that the number of the lenses that constitute the first lens unit L1 be small. For this reason, the first lens unit L1 is composed of two lenses, or a negative lens and a positive lens arranged in order from the object side to the image side. Specifically, the first lens unit L1 is composed of a negative lens and a positive lens separated from each other or a cemented lens made up of a negative lens and a positive lens that are cemented together. With this configuration, satisfactory correction of spherical aberration and chromatic aberration, which tend to occur when the zoom ratio is made high, is achieved. The third lens unit L3 is configured to include one negative lens and two positive lenses. In the first to fourth and sixth embodiments, the third lens unit L3 is composed of a positive lens, a negative lens and a positive lens arranged in order from the object side to the image side. In the fifth embodiment, the third lens unit L3 is composed of a positive lens, a positive lens, a negative lens, and a positive lens arranged in order from the object side to the image side.

With this configuration, satisfactory correction of coma, which tends to occur during image stabilization process and zooming, is achieved. The third lens unit L3 has one or more aspheric surfaces. This enables satisfactory correction of the variation in spherical aberration caused by zooming.

In the first to fourth and sixth embodiments, the fourth lens unit L4 is composed of one negative lens. This contributes to the slimming of the zoom lens in the retracted state.

In the zoom lenses according to the embodiment, the following conditions are satisfied:

$$10.5 < f1/fw < 30.0 \quad (1), \text{ and}$$

$$0.010 < |f2/ft| < 0.181 \quad (2),$$

where f1 is the focal length of the first lens unit L1, f2 is the focal length of the second lens unit L2, fw is the focal length of the whole system at the wide angle end, and ft is the focal length of the whole system at the telephoto end.

Conditional expression (1) defines an appropriate range of the ratio of the focal length f1 of the first lens unit L1 that contributes to the magnification change and the focal length fw of the whole system at the wide angle end in order to make the whole system small and to achieve wide angle of view and high zoom ratio.

A general way of achieving a wide field angle and high zoom ratio is to increase the refractive power of the lens units that contribute to the magnification change and to move the lens units for zooming. However, an excessively high refractive power will make aberration correction difficult, precluding good optical performance. On the other hand, an increase in the number of the constituent lenses for good aberration correction makes downsizing difficult. Moreover, an excessive increase in the amount of shift of the lens units makes the downsizing of the whole lens system and the camera difficult.

If the focal length f1 of the first lens unit L1 is so small relative to the focal length fw of the whole system at the wide angle end that the lower limit of conditional expression (1) is not reached, it will be difficult to correct lateral chromatic aberration at the wide angle end when the zoom lens is designed to have a wide field angle. In addition, when the zoom lens is designed to have a high zoom ratio, an increase in axial chromatic aberration and lateral chromatic aberration at the telephoto end will result. Furthermore, it will be difficult for the positive lens in the first lens unit L1 to have a sufficient edge thickness. Therefore, it is necessary to increase the effective diameter and the thickness of the lens unit larger to enable manufacturing, making downsizing and slimming of the camera difficult. Still further, the decentering sensitivity of the first lens unit L1 at the time of assembly will become high, leading to deterioration in the optical performance.

If the focal length f1 of the first lens unit L1 is so long relative to the focal length fw of the whole system at the wide angle end that the upper limit of conditional expression (1) is exceeded, the amount of shift of the first lens unit L1 at the time of zooming will be large when the zoom lens is designed to have a high zoom ratio. In consequence, it is necessary to increase the number of steps of collapse of the zoom lens when it is retracted into the camera, leading to an increase in the barrel diameter and an increase in the camera size. In addition, large spherical aberration at the telephoto end will result. Furthermore, it will be necessary to increase the amount of shift of the first lens unit L1 for zooming, leading to an increase in image blur and vibration noise upon zooming undesirably.

Conditional expression (2) defines an appropriate range of the focal length f2 of the second lens unit that contributes to the magnification change in order to make the whole system small and to achieve high zoom ratio.

If the absolute value |f2| of the focal length of the second lens unit L2 is so small relative to the focal length ft of the whole system at the telephoto end that the lower limit of conditional expression (2) is not reached, the negative refractive power (or the optical power, which is equal to the reciprocal of the focal length) of the second lens unit L2, which contributes to the magnification change, will become high. In consequence, it will be difficult to correct coma and displacement of the image plane in the zoom range from the wide angle end to a middle zoom position. Moreover, the sensitivity of deterioration of the optical performance to decentering of the second lens unit L2 will become high, making assembly of the zoom lens difficult.

If the absolute value |f2| of the focal length of the second lens unit L2 is so large relative to the focal length ft of the whole system at the telephoto end that the upper limit of conditional expression (2) is exceeded, the negative refractive power (or the optical power, which is equal to the reciprocal of the focal length) of the second lens unit L2, which contributes to the magnification change, will become low. Then, it will be necessary to make the amount of shift of the second lens unit L2 large in order to achieve a high zoom ratio. This leads to an increase in the overall length, making it difficult to achieve downsizing of the whole system. Moreover, the overall length at the wide angle end will also increase, and it will be necessary to increase the front lens effective diameter undesirably in order to achieve a sufficient light quantity in the peripheral region of the image area. Furthermore, it will be difficult to correct astigmatism in the middle zoom range.

As described above, the focal lengths f1, f2 of the first and second lens units L1, L2 are selected appropriately so that conditional expressions (1) and (2) are satisfied. With this feature, the zoom lens can be designed to have high optical performance throughout the entire zoom range, wide field angle, high zoom ratio, and small front lens effective diameter and enable to slim the camera in the retracted state while being easy to assemble in the manufacturing process and compact.

It is more desirable that the numerical range of conditional expressions (1) and (2) be further limited as follows:

$$11.0 < f1/fw < 30.0 \quad (1a), \text{ and}$$

$$0.01 < |f2/ft| < 0.15 \quad (2a).$$

It is still more desirable that the numerical range of conditional expressions (1a) and (2a) be further limited as follows:

$$11.5 < f1/fw < 30.0 \quad (1b), \text{ and}$$

$$0.03 < |f2/ft| < 0.13 \quad (2a).$$

With these conditions, a compact zoom lens having a wide field angle, high zoom ratio, and high optical performance throughout the entire zoom range can be provided.

In the zoom lens according to the present invention, it is more desirable that one or more of the following conditions be satisfied:

$$0.20 < |f2/f3| < 0.85 \quad (3),$$

$$1.7 < f3/fw < 10.0 \quad (4),$$

$$0.1 < Tdw/ft < 2.0 \quad (5),$$

$$0.1 < \beta 2w/\beta 2t < 0.4 \quad (6),$$

$$0.01 < D1G/ft < 0.15 \quad (7),$$

$$0.01 < |f2/f4| < 0.6 \quad (8),$$

$$0.1 < f1p/f1 < 1.0 \quad (9), \text{ and}$$

$$0.5 < dsw/fw < 10.0 \quad (10),$$

where Tdw is the overall length of the zoom lens (i.e. the distance from the first lens surface to the image plane) at the wide angle end, f3 is the focal length of the third lens unit L3, f4 is the focal length of the fourth lens unit L4, $\beta 2w$ is the lateral magnification of the second lens unit L2 at the wide angle end, $\beta 2t$ is the lateral magnification of the second lens unit L2 at the telephoto end, D1G is the thickness of the first lens unit L1 along the optical axis, f1p is the focal length of the positive lens in the first lens unit L1, and dsw is the distance between the aperture stop SP and the third lens unit L3 at the wide angle end.

Conditional expression (3) defines an appropriate range of the focal lengths f2 and f3 of the second lens unit L2 and the third lens unit L3, which provide the major contributions to the magnification change, for achieving downsizing of the whole system and high zoom ratio. If the absolute value of the focal length |f2| of the second lens unit L2 is so small relative to the focal length f3 of the third lens unit L3 that the lower limit of conditional expression (3) is not reached, the negative refractive power of the second lens unit L2, which contributes to the magnification change, will be too high. In consequence, it will be difficult to correct coma and displacement of the image plane in the zoom range from the wide angle end to a middle zoom position. Moreover, the sensitivity of deterioration of the optical performance to decentering of the second lens unit L2 will become high, making assembly of the zoom lens difficult.

If the absolute value |f2| of the focal length of the second lens unit L2 is so large relative to the focal length f3 of the third lens unit L3 that the upper limit of conditional expression (3) is exceeded, it will be necessary to increase the amount of shift of the second lens unit L2, which mainly contributes to the magnification change, in order to achieve a high zoom ratio. In consequence, the overall length at the wide angle end will also increase, and it will be necessary to increase the effective diameter of the first and second lens units L2, L3 in order to achieve a sufficient light quantity in the peripheral region of the image area. This leads to a difficulty in downsizing of the whole system. On the other hand, if the focal length f3 of the third lens unit L3 is small, spherical aberration at the telephoto end will be deteriorated. Moreover, the sensitivity of the third lens unit L3 will become high, making it difficult to control image stabilization, if the image stabilization is performed using the third lens unit L3.

Conditional expression (4) defines an appropriate range of the focal length f3 of the third lens unit L3 for achieving wide field angle and high zoom ratio while making the whole system small.

If the focal length f3 of the third lens unit L3 is so small relative to the focal length fw of the whole system at the wide angle end that the lower limit of conditional expression (4) is not reached, spherical aberration at the telephoto end will be deteriorated. Moreover, the sensitivity of the third lens unit L3 will become high, making it difficult to control image stabilization, if the image stabilization is performed using the third lens unit L3. Still further, the sensitivity of the third lens unit L3 to decentering (whether parallel or inclined) will become high, leading to a deterioration in the optical performance when assembly variations occur in the manufacturing process.

If the focal length f3 of the third lens unit L3 is so large relative to the focal length fw of the whole system at the wide angle end that the upper limit of conditional expression (4) is exceeded, it will become difficult to correct axial chromatic aberration mainly at the telephoto end. In addition, it will be necessary make the amount of shift of the third lens unit L3 during zooming from the wide angle end to the telephoto end large in order to achieve high zoom ratio. This leads to an increase in the overall length, making it difficult to achieve downsizing.

Conditional expression (5) defines an appropriate range of the overall length Tdw at the wide angle end for achieving high zoom ratio while making the whole system small. If the overall length Tdw at the wide angle end is so short that the lower limit of conditional expression (5) is not reached, it will be difficult to correct curvature of field and distortion mainly at the wide angle end. A high zoom ratio necessitates a large overall length at the telephoto end, making downsizing difficult. Furthermore, it will be necessary to make the front lens effective diameter large in order to lessen steep fall-off of the light quantity in the peripheral region of the image frame in the zoom range near the telephoto end, and it will be necessary to make the thickness of the positive lens in the first lens unit L1 large in order for the positive lens to have an appropriate edge thickness. This will makes downsizing of the whole system and slimming of a camera (when the zoom lens is used in the camera) difficult.

If the overall length Tdw at the wide angle end is so large that the upper limit of conditional expression (5) is exceeded, it will be necessary to make the front lens effective diameter large in order to lessen fall-off of the light quantity in the peripheral region of the image frame in the zoom range near the wide angle end, making downsizing of the whole system and slimming of a camera (when the zoom lens is used in the camera) difficult.

Conditional expression (6) defines an appropriate range of the ratio of the lateral magnification β2w of the second lens unit L2 at the wide angle end and the lateral magnification β2t of the second lens unit L2 at the telephoto end in order to achieve high zoom ratio making the whole system small. If the lateral magnification β2w of the second lens unit L2 at the wide angle end is so small relative to the lateral magnification β2t of the second lens unit L2 at the telephoto end that the lower limit of conditional expression (6) is not reached, it will be necessary to make the amount of shift of the second lens unit at the time of zooming large. This undesirably leads to an increase in the overall length and overall size. If the lateral magnification β2w of the second lens unit L2 at the wide angle end is so large relative to the lateral magnification β2t of the second lens unit L2 at the telephoto end that the upper limit of conditional expression (6) is exceeded, it will be difficult to achieve satisfactory correction of coma and displacement of the image plane throughout the entire zoom range. Moreover, an increase in the front lens effective diameter will be necessitated, making downsizing of the whole system difficult.

Conditional expression (7) is a condition for making the thickness of the camera at a time of a retracted state small while achieving high zoom ratio. If the thickness D1G of the first lens unit L1 along the optical axis is so small relative to the focal length ft of the whole system at the telephoto end that the lower limit of conditional expression (7) is not reached, the overall length of the whole system at the telephoto end will be large. Moreover, it will be difficult to correct spherical aberration at the telephoto end. If the thickness D1G of the first lens unit L1 along the optical axis is so large relative to the focal length ft of the whole system at the telephoto end that the upper limit of conditional expression (7) is exceeded, the thickness of the lens at a time of a retracted state will be large, making it difficult to make the camera slim. Furthermore, it will be difficult to correct axial chromatic aberration at the telephoto end. Still further, the sensitivity of the first lens unit L1 to decentering (whether parallel or inclined) will become high, making manufacturing difficult.

Conditional expression (8) is a condition for determining appropriate values of the focal lengths f2, f4 of the second and fourth lens units L2, L4 to achieve good optical performance while making the first lens unit L1 and the second lens unit L2 small when the zoom lens is designed to have wide angle of view and high zoom ratio. If the focal length f2 of the second lens unit L2 is so small relative to the focal length f4 of the fourth lens unit L4 that the lower limit of conditional expression (8) is not reached, the second lens unit L2 is required to provide large magnification change for zooming, making correction of coma difficult throughout the entire zoom range. Furthermore, the sensitivity of the second lens unit L2 to decentering (whether parallel or inclined) will become high, making assembly difficult. Still further, it will be difficult to reduce image blur at the time of zooming.

If the focal length f2 of the second lens unit L2 is so large relative to the focal length f4 of the fourth lens unit L4 that the upper limit of conditional expression (8) is exceeded, it will be necessary to make the amount of shift of the second lens unit L2, which is the main zooming lens unit, large. This leads to an increase in the overall length at the wide angle end and an increase in the effective diameter of the lenses in the first lens unit L1 and the second lens unit L2, making downsizing and slimming difficult. Moreover, if the focal length f4 of the fourth lens unit L4 is too large, rays will diverge greatly. In consequence, the angle of incidence of rays (particularly in the peripheral region of the image area) on the image pickup surface will become large, undesirably causing color shading greatly.

Conditional expression (9) is a condition for determining appropriate values of the focal length f1p of the positive lens in the first lens unit L1 and the focal length f1 of the first lens unit L1 to reduce the thickness of the first lens unit L1, to reduce the thickness of the camera at a time in a retracted state, and to achieve good optical performance throughout the entire zoom range. If the focal length f1p of the positive lens in the first lens unit L1 is so small relative to the focal length f1 of the first lens unit L1 that the lower limit of conditional expression (9) is not reached, it will be necessary for the positive lens to have a large thickness in order to have an appropriate edge thickness. In consequence, the thickness of the first lens unit will increase, making slimming of the camera difficult. Moreover, it will be difficult to correct chromatic aberration at the telephoto end. Furthermore, the sensitivity to decentering (whether inclined or parallel) in the assembly process will become high, undesirably.

If the focal length f1p of the positive lens in the first lens unit L1 is so large relative to the focal length f1 of the first lens unit L1 that the upper limit of conditional expression (9) is exceeded, it will be necessary to make the amount of shift of the first lens unit L1 at the time of zooming from the wide angle end to the telephoto end. In consequence, the thickness of the camera in the state in which the lens units are retracted will be large, undesirably. Still further, it will be difficult to correct spherical aberration at the telephoto end.

Conditional expression (10) defines an appropriate range of the ratio of the distance dsw between the aperture stop SP and the third lens unit L3 at the wide angle end and the focal length fw of the whole system at the wide angle end to achieve a reduction of the front lens effective diameter and to prevent abrupt fall-off of light quantity in the peripheral region of the image area in the zoom range near the wide angle end. Conditional expression (10) is also a condition for achieving good optical performance throughout the entire zoom range.

If the distance dsw between the aperture stop SP and the third lens unit L3 at the wide angle end is so small relative to the focal length fw at the wide angle end that the lower limit of conditional expression (10) is not reached, abrupt vignetting will be caused in the peripheral region of the image area by the aperture stop SP mainly in the zoom range near the wide angle end. This undesirably results in abrupt brightness fall-off at a certain middle image height in the image. Increasing the light quantity in the peripheral region of the image area at the wide angle end to improve the brightness fall-off requires an undesirable increase in the front lens effective diameter and leads to the occurrence of coma flare at the wide angle end, which deteriorates the image quality, undesirably.

If the distance dsw between the aperture stop SP and the third lens unit L3 at the wide angle end is so large relative to the focal length fw at the wide angle end that the upper limit of conditional expression (10) is exceeded, the absolute light quantity in the peripheral region of the image area will become insufficient, and it will be difficult to correct aberrations particularly in the zoom range near the wide angle end.

To further reduce the overall size of the lens system while making aberrations and the variation of aberrations smaller, it is desirable that the numerical ranges of conditional expressions (3) to (10) be further limited as follows:

$$0.30 < |f2/f3| < 0.75 \quad (3a),$$

$$2.0 < f3/fw < 8.0 \quad (4a),$$

$$0.2 < Tdw/ft < 1.7 \quad (5a),$$

$$0.10 < \beta 2w/\beta 2t < 0.38 \quad (6a),$$

$$0.01 < D1G/ft < 0.12 \quad (7a),$$

$$0.05 < |f2/f4| < 0.60 \quad (8a),$$

$$0.2 < f1p/f1 < 0.8 \quad (9a), \text{ and}$$

$$0.5 < dsw/fw < 7.0 \quad (10a).$$

According to the embodiment constructed as above, there can be provided zoom lenses that are small in the overall size of the optical system, enable to make a camera slim in the retracted state, have a wide angle of view and a high zoom ratio higher than 10, and have high optical performance throughout the entire zoom range.

In the following, numerical embodiments 1 to 6 corresponding to the first to sixth embodiments of the present invention will be described. In the numerical embodiments, there are presented the surface number i of the optical surfaces counted from the object side, the radius of curvature ri of the i-th optical surface, the distance di between the i-th surface and the (i+1)-th surface, the refractive index ndi of the i-th optical member, the Abbe number vdi of the i-th optical member.

The aspheric surface shapes are expressed by the following equation in terms of displacement (or distance) x from the surface vertex as the reference point in the direction parallel to the optical axis at height h from the optical axis:

$$x = (h^2/R)/[1+[1-(1+k)(h/R)_2]^{1/2}] + A4h^4 + A6h^6 + A8h^8 + A10h^{10},$$

where k is the eccentricity, A4, A6, A8 and A10 are aspheric coefficients, and R is the paraxial radius of curvature. The expression like "E-Z" stands for "$10^{-z}$". In the numerical embodiments, the last two surfaces are the surfaces of an optical block such as a filter or a face plate. In the numerical embodiments, the back focus (BF) is the distance from the last lens surface to the paraxial image plane expressed by the equivalent air distance. The overall lens length (OLL) is equal to the sum of the distance from the surface closest to the object to the last surface and the back focus. In table 1, the values associated with the above-described condition expressions are presented for all the numerical embodiments.

In the numerical embodiments, the aperture stop SP and the image side glass block G are regarded as units. Therefore, the number of lens units in the zoom lens according to each numerical embodiment is larger than the actual number of lens units by two.

Numerical Embodiment 1

Lengths in the following tables are in millimeters.

| Surface Data | | | | |
|---|---|---|---|---|
| surface number i | r | d | nd | vd |
| 1 | 38.800 | 1.00 | 1.80610 | 33.3 |
| 2 | 22.764 | 0.20 | | |
| 3* | 19.726 | 4.00 | 1.59282 | 68.6 |
| 4* | −176.534 | (variable) | | |
| 5 | 79.907 | 0.70 | 1.88300 | 40.8 |
| 6 | 6.933 | 3.40 | | |
| 7 | −25.187 | 0.70 | 1.83481 | 42.7 |
| 8 | 37.268 | 0.20 | | |
| 9 | 15.164 | 1.80 | 1.94595 | 18.0 |
| 10 | 97.721 | (variable) | | |
| 11 (stop) | ∞ | (variable) | | |
| 12* | 9.290 | 3.00 | 1.58313 | 59.4 |
| 13* | −66.004 | 1.80 | | |
| 14 | 27.259 | 0.70 | 1.84666 | 23.9 |
| 15 | 9.430 | 0.80 | | |
| 16 | 18.844 | 2.00 | 1.48749 | 70.2 |
| 17 | −14.450 | 0.30 | | |
| 18 (flare cut filter) | ∞ | (variable) | | |
| 19 | 175.842 | 1.00 | 1.48749 | 70.2 |
| 20 | 13.567 | (variable) | | |
| 21 | 14.017 | 2.00 | 1.48749 | 70.2 |
| 22 | 4258.686 | (variable) | | |
| 23 | ∞ | 1.00 | 1.51633 | 64.1 |
| 24 | ∞ | (variable) | | |
| image plane | ∞ | | | |

| Aspheric Surface Data |
|---|
| 3rd surface |

K = −1.39314e−001  A4 = −2.16938e−006  A6 = 1.16365e−008
A8 = 6.06296e−011

4th surface

K = −1.76207e+001  A4 = 4.07411e−007  A6 = 2.50396e−008
A8 = 3.19540e−013

12th surface

K = −1.81829e+000  A4 = 1.69626e−004  A6 = −1.47480e−006
A8 = 3.16354e−008

13th surface

K = −1.85610e+002  A4 = 4.21676e−005

| Various Data zoom ratio 10.12 | | | | | |
|---|---|---|---|---|---|
| focal length | 5.05 | 12.80 | 51.09 | 6.60 | 21.78 |
| F number | 2.87 | 4.10 | 5.58 | 3.32 | 3.90 |
| field angle | 34.63 | 16.85 | 4.34 | 30.40 | 10.09 |
| image height | 3.49 | 3.88 | 3.88 | 3.88 | 3.88 |
| OLL | 69.65 | 68.82 | 89.47 | 66.55 | 80.54 |
| BF | 8.50 | 16.77 | 13.10 | 10.31 | 18.94 |
| d4 | 0.70 | 9.76 | 27.98 | 2.55 | 19.20 |
| d10 | 23.10 | 11.85 | 2.96 | 20.19 | 3.91 |
| d11 | 7.67 | 1.50 | 1.52 | 3.75 | 6.08 |
| d18 | 3.40 | 1.96 | 11.50 | 3.26 | 1.73 |
| d20 | 2.68 | 3.38 | 8.81 | 2.89 | 7.09 |
| d22 | 7.24 | 15.51 | 11.84 | 9.05 | 17.68 |
| d24 | 0.60 | 0.60 | 0.60 | 0.60 | 0.60 |

| Zoom Lens Unit Data | | |
|---|---|---|
| unit | first surface | focal length |
| 1 | 1 | 53.30 |
| 2 | 5 | −8.57 |
| 3 | 11 | ∞ |
| 4 | 12 | 14.55 |
| 5 | 19 | −30.22 |
| 6 | 21 | 28.84 |
| 7 | 23 | ∞ |

Numerical Embodiment 2

Lengths in the following tables are in millimeters.

| Surface Data | | | | |
|---|---|---|---|---|
| surface number i | r | d | nd | vd |
| 1 | 69.679 | 1.30 | 1.80610 | 33.3 |
| 2 | 40.231 | 0.20 | | |
| 3* | 28.101 | 5.00 | 1.49700 | 81.5 |
| 4* | −86.856 | (variable) | | |
| 5 | 189.770 | 1.00 | 1.88300 | 40.8 |
| 6 | 8.053 | 3.60 | | |
| 7 | −27.748 | 0.70 | 1.83481 | 42.7 |
| 8 | 55.972 | 0.20 | | |
| 9 | 17.318 | 2.00 | 1.94595 | 18.0 |
| 10 | 111.345 | (variable) | | |
| 11 (stop) | ∞ | (variable) | | |
| 12* | 9.189 | 3.00 | 1.58313 | 59.4 |
| 13* | −194.351 | 1.93 | | |
| 14 | 21.684 | 0.70 | 1.84666 | 23.9 |
| 15 | 9.089 | 0.80 | | |
| 16 | 25.828 | 2.00 | 1.48749 | 70.2 |
| 17 | −15.243 | 0.30 | | |
| 18 (flare cut filter) | ∞ | (variable) | | |
| 19 | −47.772 | 1.00 | 1.48749 | 70.2 |
| 20 | 24.121 | (variable) | | |
| 21 | 18.098 | 2.00 | 1.48749 | 70.2 |
| 22 | −132.406 | (variable) | | |
| 23 | ∞ | 1.00 | 1.51633 | 64.1 |
| 24 | ∞ | (variable) | | |
| image plane | ∞ | | | |

| Aspheric Surface Data |
|---|
| 3rd surface |

K = −2.66095e−001  A4 = −9.22048e−007  A6 = −1.26585e−009
A8 = 2.12170e−012

4th surface

K = −1.52648e+000  A4 = 2.13694e−006  A6 = −9.50786e−010
A8 = 2.70734e−012

12th surface

K = −1.65289e+000  A4 = 1.67980e−004  A6 = −7.48837e−008
A8 = 1.02683e−008

13th surface

K = −1.21619e+002  A4 = 9.51630e−005

| Various Data zoom ratio 19.41 | | | | | |
|---|---|---|---|---|---|
| focal length | 5.15 | 12.83 | 99.99 | 6.63 | 25.40 |
| F-number | 2.77 | 4.02 | 6.00 | 3.19 | 3.94 |
| field angle | 34.10 | 16.81 | 2.22 | 30.31 | 8.67 |
| image height | 3.49 | 3.88 | 3.88 | 3.88 | 3.88 |
| OLL | 81.30 | 79.47 | 113.01 | 77.23 | 95.47 |
| BF | 9.22 | 16.32 | 11.71 | 10.05 | 21.63 |
| d4 | 0.70 | 10.80 | 44.79 | 2.10 | 25.99 |
| d10 | 28.44 | 15.02 | 2.06 | 24.63 | 5.67 |

-continued

| | | | | | |
|---|---|---|---|---|---|
| d11 | 10.47 | 2.86 | 1.74 | 6.53 | 6.21 |
| d18 | 3.94 | 3.29 | 9.90 | 4.20 | 2.21 |
| d20 | 2.81 | 5.45 | 17.09 | 3.99 | 8.03 |
| d22 | 7.56 | 14.66 | 10.05 | 8.39 | 19.97 |
| d24 | 1.00 | 1.00 | 1.00 | 1.00 | 1.00 |

Zoom Lens Unit Data

| unit | first surface | focal length |
|---|---|---|
| 1 | 1 | 67.69 |
| 2 | 5 | −9.93 |
| 3 | 11 | ∞ |
| 4 | 12 | 16.07 |
| 5 | 19 | −32.73 |
| 6 | 21 | 32.80 |
| 7 | 23 | ∞ |

Numerical Embodiment 3

Lengths in the following tables are in millimeters.

Surface Data

| surface number i | r | d | nd | vd |
|---|---|---|---|---|
| 1 | 72.921 | 1.30 | 1.80610 | 33.3 |
| 2 | 39.106 | 0.20 | | |
| 3* | 25.670 | 6.00 | 1.49700 | 81.5 |
| 4* | −69.067 | (variable) | | |
| 5 | −96.059 | 0.70 | 1.88300 | 40.8 |
| 6 | 6.833 | 2.50 | | |
| 7 | −23.071 | 0.70 | 1.83481 | 42.7 |
| 8 | 36.283 | 0.20 | | |
| 9 | 14.509 | 1.80 | 1.94595 | 18.0 |
| 10 | 371.396 | (variable) | | |
| 11 (stop) | ∞ | (variable) | | |
| 12* | 8.091 | 3.00 | 1.58313 | 59.4 |
| 13* | −132.445 | 1.19 | | |
| 14 | 34.308 | 0.70 | 1.84666 | 23.9 |
| 15 | 9.504 | 0.80 | | |
| 16 | 19.539 | 2.00 | 1.48749 | 70.2 |
| 17 | −9.189 | 0.30 | | |
| 18 (flare cut filter) | ∞ | (variable) | | |
| 19 | −97.300 | 1.00 | 1.48749 | 70.2 |
| 20 | 14.978 | (variable) | | |
| 21 | 14.077 | 2.00 | 1.48749 | 70.2 |
| 22 | 75.245 | (variable) | | |
| 23 | ∞ | 1.00 | 1.51633 | 64.1 |
| 24 | ∞ | (variable) | | |
| image plane | ∞ | | | |

Aspheric Surface Data

3rd surface

K = −1.06758e−001   A4 = −1.96907e−006   A6 = −1.12657e−008
A8 = −7.28147e−013

4th surface

K = −1.16870e+001   A4 = 4.43924e−007   A6 = −8.55587e−009
A8 = 1.35361e−011

12 the surface

K = −1.36003e+000   A4 = 2.89727e−004   A6 = −1.03215e−006
A8 = 5.59531e−008

13th surface

K = −1.28658e+003   A4 = 4.22778e−004

Various Data
zoom ratio 19.38

| focal length | 5.16 | 14.11 | 99.98 | 6.99 | 24.38 | 55.31 |
|---|---|---|---|---|---|---|
| F number | 2.77 | 4.07 | 6.00 | 3.19 | 4.56 | 4.94 |
| field angle | 34.06 | 15.35 | 2.22 | 29.02 | 9.03 | 4.01 |
| image height | 3.49 | 3.88 | 3.88 | 3.88 | 3.88 | 3.88 |
| OLL | 59.81 | 62.45 | 106.42 | 56.67 | 83.12 | 101.51 |
| BF | 7.58 | 13.98 | 7.50 | 7.19 | 19.55 | 17.97 |
| d4 | 0.70 | 7.19 | 40.80 | 0.94 | 21.44 | 36.14 |
| d10 | 18.09 | 4.73 | 1.39 | 14.34 | 1.49 | 1.54 |
| d11 | 3.62 | 2.98 | 1.42 | 1.45 | 5.01 | 2.81 |
| d18 | 3.92 | 5.61 | 3.28 | 5.39 | 1.93 | 1.74 |
| d20 | 1.51 | 3.58 | 27.63 | 2.97 | 9.31 | 16.92 |
| d22 | 5.92 | 12.32 | 5.84 | 5.53 | 17.89 | 16.31 |
| d24 | 1.00 | 1.00 | 1.00 | 1.00 | 1.00 | 1.00 |

Zoom Lens Unit Data

| unit | first surface | focal length |
|---|---|---|
| 1 | 1 | 59.82 |
| 2 | 5 | −7.76 |
| 3 | 11 | ∞ |
| 4 | 12 | 12.26 |
| 5 | 19 | −26.55 |
| 6 | 21 | 35.15 |
| 7 | 23 | ∞ |

Numerical Embodiment 4

Lengths in the following tables are in millimeters.

Surface Data

| surface number i | r | d | nd | vd |
|---|---|---|---|---|
| 1 | 54.857 | 1.30 | 1.80610 | 33.3 |
| 2 | 37.830 | 4.50 | 1.49700 | 81.5 |
| 3* | −141.341 | (variable) | | |
| 4 | 58.929 | 0.80 | 1.88300 | 40.8 |
| 5 | 9.135 | 4.70 | | |
| 6 | −38.148 | 0.70 | 1.83481 | 42.7 |
| 7 | 48.830 | 0.20 | | |
| 8 | 19.201 | 2.00 | 1.94595 | 18.0 |
| 9 | 85.832 | (variable) | | |
| 10 (stop) | ∞ | (variable) | | |
| 11* | 9.165 | 4.00 | 1.58313 | 59.4 |
| 12* | −399.369 | 1.08 | | |
| 13 | 21.313 | 0.70 | 1.84666 | 23.9 |
| 14 | 9.387 | 1.50 | | |
| 15 | 62.005 | 2.50 | 1.48749 | 70.2 |
| 16 | −13.852 | 0.30 | | |
| 17 (flare cut filter) | ∞ | (variable) | | |
| 18 | −51.666 | 1.00 | 1.48749 | 70.2 |
| 19 | 21.049 | (variable) | | |
| 20 | 15.276 | 2.00 | 1.48749 | 70.2 |
| 21 | 679.825 | (variable) | | |
| 22 | ∞ | 1.00 | 1.51633 | 64.1 |
| 23 | ∞ | (variable) | | |
| image plane | ∞ | | | |

Aspheric Surface Data

3rd surface

K = −9.59704e+000   A4 = 1.35033e−007   A6 = −8.96886e−010
A8 = 3.50282e−012

11th surface

K = −1.72566e+000   A4 = 1.81602e−004   A6 = −1.20965e−007
A8 = 6.95581e−009

12th surface

K = 2.41331e+003   A4 = 1.16660e−004

-continued

| Various Data | | | | | |
|---|---|---|---|---|---|
| zoom ratio 20.79 | | | | | |
| focal length | 4.81 | 10.55 | 99.99 | 5.97 | 21.57 |
| F number | 2.07 | 2.98 | 6.00 | 2.37 | 3.40 |
| field angle | 35.95 | 20.17 | 2.22 | 32.98 | 10.19 |
| image height | 3.49 | 3.88 | 3.88 | 3.88 | 3.88 |
| OLL | 94.36 | 90.68 | 134.70 | 89.16 | 109.94 |
| BF | 8.60 | 13.53 | 7.34 | 9.29 | 15.06 |
| d3 | 0.70 | 9.02 | 60.25 | 0.65 | 29.84 |
| d9 | 34.03 | 19.23 | 1.49 | 30.05 | 7.68 |
| d10 | 17.38 | 8.75 | 2.12 | 13.34 | 10.16 |
| d17 | 5.52 | 2.68 | 18.94 | 4.59 | 4.50 |
| d19 | 0.87 | 10.19 | 17.27 | 3.96 | 15.43 |
| d21 | 6.94 | 11.87 | 5.68 | 7.63 | 13.40 |
| d23 | 1.00 | 1.00 | 1.00 | 1.00 | 1.00 |

| Zoom Lens Unit Data | | |
|---|---|---|
| unit | first surface | focal length |
| 1 | 1 | 99.81 |
| 2 | 4 | −12.37 |
| 3 | 10 | ∞ |
| 4 | 11 | 17.57 |
| 5 | 18 | −30.54 |
| 6 | 20 | 32.02 |
| 7 | 22 | ∞ |

Numerical Embodiment 5

Lengths in the following tables are in millimeters.

| Surface Data | | | | |
|---|---|---|---|---|
| surface number i | r | d | nd | νd |
| 1 | 28.734 | 1.10 | 1.84666 | 23.9 |
| 2 | 18.301 | 3.00 | 1.77250 | 49.6 |
| 3 | 160.447 | (variable) | | |
| 4 | 52.843 | 0.70 | 1.88300 | 40.8 |
| 5 | 5.838 | 3.30 | | |
| 6 | −16.280 | 0.65 | 2.00069 | 25.5 |
| 7 | 38.437 | 0.18 | | |
| 8 | 16.909 | 1.80 | 1.94595 | 18.0 |
| 9 | −32.759 | (variable) | | |
| 10 (stop) | ∞ | (variable) | | |
| 11* | 5.887 | 2.30 | 1.55332 | 71.7 |
| 12* | −39.587 | 0.20 | | |
| 13 | 7.492 | 2.20 | 1.56732 | 42.8 |
| 14 | −7.137 | 0.50 | 1.80610 | 33.3 |
| 15 | 5.431 | 0.90 | | |
| 16* | 446.959 | 1.00 | 1.55332 | 71.7 |
| 17 | −18.387 | 0.50 | | |
| 18 (flare cut filter) | ∞ | (variable) | | |
| 19 | 10.343 | 2.00 | 1.48749 | 70.2 |
| 20 | 47.074 | 0.80 | 1.84666 | 23.9 |
| 21 | 36.906 | (variable) | | |
| 22 | ∞ | 1.00 | 1.51633 | 64.1 |
| 23 | ∞ | (variable) | | |
| image plane | ∞ | | | |

| Aspheric Surface Data |
|---|
| 12th surface |

K = −3.16073e−001    A4 = 1.20791e−004    A6 = −2.20466e−006
A8 = 5.06689e−007

| 12th surface |
|---|

K = −1.21760e+002    A4 = −3.66130e−005

-continued

| 16th surface |
|---|

K = −4.45328e+004    A4 = −6.03093e−004    A6 = −1.29512e−005
A8 = −8.09819e−006

| Various Data | | | | | |
|---|---|---|---|---|---|
| zoom ratio 10.14 | | | | | |
| focal length | 4.40 | 8.52 | 44.65 | 6.00 | 17.20 |
| F number | 2.48 | 3.01 | 5.97 | 2.74 | 3.93 |
| field angle | 37.76 | 24.46 | 4.96 | 32.09 | 12.70 |
| image height | 3.41 | 3.88 | 3.88 | 3.76 | 3.88 |
| OLL | 49.50 | 47.42 | 73.52 | 46.60 | 55.74 |
| BF | 6.20 | 9.15 | 3.22 | 7.39 | 11.09 |
| d3 | 0.40 | 5.82 | 24.07 | 1.89 | 12.71 |
| d9 | 14.90 | 5.19 | 1.94 | 8.91 | 2.18 |
| d10 | 5.91 | 5.33 | 1.40 | 6.02 | 3.04 |
| d18 | 0.96 | 0.81 | 21.75 | 1.25 | 5.58 |
| d21 | 4.54 | 7.49 | 1.56 | 5.73 | 9.43 |
| d23 | 1.00 | 1.00 | 1.00 | 1.00 | 1.00 |

| Zoom Lens Unit Data | | |
|---|---|---|
| unit | first surface | focal length |
| 1 | 1 | 47.70 |
| 2 | 4 | −8.03 |
| 3 | 10 | ∞ |
| 4 | 11 | 12.39 |
| 5 | 19 | 30.00 |
| 6 | 22 | ∞ |

Numerical Embodiment 6

Lengths in the following tables are in millimeters.

| Surface Data | | | | |
|---|---|---|---|---|
| surface number i | r | d | nd | νd |
| 1 | 69.574 | 1.10 | 1.80610 | 33.3 |
| 2 | 40.349 | 0.20 | | |
| 3* | 26.709 | 5.50 | 1.49700 | 81.5 |
| 4* | −84.904 | (variable) | | |
| 5 | 108.417 | 1.00 | 1.88300 | 40.8 |
| 6 | 8.202 | 4.00 | | |
| 7 | −36.778 | 0.70 | 1.88300 | 40.8 |
| 8 | 39.577 | 0.20 | | |
| 9 | 16.659 | 2.00 | 1.94595 | 18.0 |
| 10 | 88.160 | (variable) | | |
| 11 (stop) | ∞ | (variable) | | |
| 12* | 9.278 | 3.00 | 1.58313 | 59.4 |
| 13* | −287.912 | 1.70 | | |
| 14 | 20.285 | 0.70 | 1.84666 | 23.9 |
| 15 | 9.101 | 1.00 | | |
| 16 | −1903.336 | 2.00 | 1.48749 | 70.2 |
| 17 | −19.642 | 0.30 | | |
| 18 (flare cut filter) | ∞ | (variable) | | |
| 19 | 20.560 | 2.00 | 1.48749 | 70.2 |
| 20 | 154.160 | (variable) | | |
| 21 | ∞ | 1.00 | 1.51633 | 64.1 |
| 22 | ∞ | (variable) | | |
| image plane | ∞ | | | |

| Aspheric Surface Data |
|---|
| 3rd surface |

K = −3.01923e−001    A4 = −1.71502e−006    A6 = 4.11023e−009
A8 = 1.59127e−011

| 4th surface |
|---|

K = −1.02007e+001    A4 = 8.42450e−009    A6 = 9.20998e−009
A8 = 3.98408e−013

-continued

12th surface

K = −1.34167e+000   A4 = 9.53786e−005   A6 = −2.44674e−008
A8 = 4.22721e−009

13th surface

K = 1.03631e+003   A4 = 3.34184e−005

Various Data
zoom ratio 20.20

| | | | | | |
|---|---|---|---|---|---|
| focal length | 4.95 | 13.48 | 100.00 | 6.42 | 28.61 |
| F number | 2.87 | 4.51 | 5.73 | 3.32 | 4.60 |
| field angle | 34.56 | 16.04 | 2.22 | 31.10 | 7.71 |
| image height | 3.41 | 3.88 | 3.88 | 3.88 | 3.88 |
| OLL | 89.83 | 82.36 | 117.85 | 83.83 | 97.78 |
| BF | 13.98 | 20.80 | 18.09 | 14.83 | 25.86 |
| d4 | 0.70 | 8.84 | 41.68 | 1.52 | 23.19 |
| d10 | 33.51 | 17.15 | 2.17 | 28.64 | 6.40 |
| d11 | 12.02 | 1.69 | 2.69 | 7.30 | 5.19 |
| d18 | 4.22 | 8.49 | 27.83 | 6.14 | 11.75 |
| d20 | 12.33 | 19.14 | 16.43 | 13.18 | 24.20 |
| d22 | 1.00 | 1.00 | 1.00 | 1.00 | 1.00 |

Zoom Lens Unit Data

| unit | first surface | focal length |
|---|---|---|
| 1 | 1 | 63.06 |
| 2 | 5 | −10.24 |
| 3 | 11 | ∞ |
| 4 | 12 | 22.28 |
| 5 | 19 | 48.43 |
| 6 | 21 | ∞ |

TABLE 1

| conditional expression | embodiment 1 | embodiment 2 | embodiment 3 | embodiment 4 | embodiment 5 | embodiment 6 |
|---|---|---|---|---|---|---|
| (1) 10.5 < f1/fw < 30.0 | 10.555 | 13.139 | 11.596 | 20.754 | 10.837 | 12.740 |
| (2) 0.010 < \|f2/ft\| < 0.181 | 0.168 | 0.099 | 0.078 | 0.124 | 0.180 | 0.102 |
| (3) 0.2 < \|f2/f3\| < 0.85 | 0.589 | 0.618 | 0.633 | 0.704 | 0.649 | 0.460 |
| (4) 1.7 < f3/fw < 10.0 | 2.881 | 3.120 | 2.376 | 3.654 | 2.814 | 4.501 |
| (5) 0.1 < Tdw/ft < 2.0 | 1.370 | 0.816 | 0.602 | 0.947 | 1.116 | 0.902 |
| (6) 0.1 < β2w/β2t < 0.4 | 0.337 | 0.186 | 0.174 | 0.285 | 0.351 | 0.162 |
| (7) 0.01 < D1G/ft < 0.15 | 0.102 | 0.065 | 0.075 | 0.058 | 0.092 | 0.068 |
| (8) 0.01 < \|f2/f4\| < 0.6 | 0.284 | 0.304 | 0.292 | 0.405 | 0.268 | 0.212 |
| (9) 0.1 < f1p/f1 < 1.0 | 0.566 | 0.640 | 0.643 | 0.607 | 0.555 | 0.659 |
| (10) 0.5 < dsw/fw < 10.0 | 1.519 | 2.032 | 0.701 | 3.614 | 1.342 | 2.428 |

In the following, an embodiment of a digital still camera that uses as a taking optical system a zoom lens like those according to the embodiments will be described with reference to FIG. 13.

In FIG. 13, the digital still camera includes a camera body 20 and a taking optical system 21 constituted by any one of the zoom lenses described as the first to sixth embodiments. The digital still camera also has a solid state image pickup element (or photo electric conversion element) 22 such as a CCD sensor or a CMOS sensor provided in the camera body to receive an object image formed by the taking optical system 21, a memory 23 for storing information representing the object image obtained by photoelectric conversion by the solid state image pickup element 22, and a finder 24 composed of a liquid crystal display panel or the like to allow a user to observe the object image formed on the solid state image pickup element 22.

As described above, a compact image pickup apparatus having high optical performance can be provided by using the zoom lens according to the present invention in the image pickup apparatus such as a digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-228571, filed Oct. 8, 2010, which is hereby incorporated by reference herein in its entirety.

What is claimed is:

1. A zoom lens comprising of, in order from an object side to an image side, a first lens unit having a positive refractive power, a second lens unit having a negative refractive power, a third lens unit having a positive refractive power, and a rear group including one or more lens units, wherein the first lens unit consists of a negative lens and a positive lens, the lens units move at a time of zooming, the position of the first lens unit at the telephoto end is displaced toward the object side from its position at the wide angle end, the position of the third lens unit at the telephoto end is displaced toward the object side from its position at the wide angle end, and the zoom lens satisfies the following conditional expressions:

$$10.5 < f1/fw < 30.0, \text{ and}$$

$$0.010 < |f2/ft| < 0.181,$$

where f1 is the focal length of the first lens unit, f2 is the focal length of the second lens unit, fw is the focal length of the whole system at the wide angle end, and ft is the focal length of the whole system at the telephoto end.

2. A zoom lens according to claim 1, wherein the zoom lens satisfies the following conditional expression:

$$0.20 < |f2/f3| < 0.85,$$

where f3 is the focal length of the third lens unit.

3. A zoom lens according to claim 1, wherein the zoom lens satisfies the following conditional expression:

$$2.0 < f3/fw < 10.0,$$

where f3 is the focal length of the third lens unit.

4. A zoom lens according to claim 1, wherein the zoom lens satisfies the following conditional expression:

$$0.1 < Tdw/ft < 1.5,$$

where Tdw is the overall length of the zoom lens at the wide angle end.

5. A zoom lens according to claim 1, wherein the zoom lens satisfies the following conditional expression:

$$0.1 < β2w/β2t < 0.4,$$

where β2w is the lateral magnification of the second lens unit at the wide angle end, β2t is the lateral magnification of the second lens unit at the telephoto end.

6. A zoom lens according to claim 1, wherein the zoom lens satisfies the following conditional expression:

$$0.01 < D1G/ft < 0.15,$$

where D1G is the thickness of the first lens unit along the optical axis.

7. A zoom lens according to claim 1, wherein the rear group consists, in order from the object side to the image side, of a fourth lens unit having a negative refractive power and a fifth lens unit having a positive refractive power.

8. A zoom lens according to claim 7, wherein the zoom lens satisfies the following conditional expression:

$$0.01 < |f2/f4| < 0.6,$$

where f4 is the focal length of the fourth lens unit.

9. A zoom lens according to claim 1, wherein the rear group consists of a fourth lens unit having a positive refractive power.

10. A zoom lens according to claim 9, wherein the zoom lens satisfies the following conditional expression:

$$0.01 < |f2/f4| < 0.6,$$

where f4 is the focal length of the fourth lens unit.

11. A zoom lens according to claim 1, wherein the zoom lens satisfies the following conditional expression:

$$0.1 < f1p/f1 < 1.0,$$

where f1p is the focal length of the positive lens in the first lens unit.

12. A zoom lens according to claim 1 further comprising an aperture stop that is provided on the object side of the third lens unit and moves along a locus different from loci of the lens units at a time of zooming, wherein the zoom lens satisfies the following conditional expression:

$$0.5 < dsw/fw < 10.0,$$

where dsw is the distance between the aperture stop and the third lens unit at the wide angle end.

13. A zoom lens according to claim 1, wherein the third lens unit comprises one negative lens and two positive lenses.

14. A zoom lens according to claim 1, wherein the third lens unit is shifted in a direction having a component perpendicular to the optical axis to thereby shift the imaging position of the zoom lens in a direction perpendicular to the optical axis.

15. A zoom lens according to claim 1, wherein the zoom lens forms an image on a solid state image pickup element.

16. An image pickup apparatus comprising a zoom lens according to claim 1 and a solid state image pickup element that receives an image formed by the zoom lens.

* * * * *